(12) United States Patent
Eckman et al.

(10) Patent No.: US 11,479,411 B2
(45) Date of Patent: *Oct. 25, 2022

(54) AUTOMATIC TRANSPORTATION OF PALLETS OF GOODS

(71) Applicant: Lineage Logistics, LLC, Irvine, CA (US)

(72) Inventors: Christopher Frank Eckman, San Francisco, CA (US); Daniël Walet, Oakland, CA (US); Elliott Gerard Wolf, Oakland, CA (US); Frank Baijens, Irvine, CA (US); Sudarsan Thattai, Palos Verdes Estates, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,457

(22) Filed: Oct. 19, 2020

(65) Prior Publication Data

US 2021/0269242 A1    Sep. 2, 2021

Related U.S. Application Data

(63) Continuation of application No. 16/843,772, filed on Apr. 8, 2020, now Pat. No. 10,809,727.
(Continued)

(51) Int. Cl.
*B65G 1/137* (2006.01)
*G01C 21/20* (2006.01)
(Continued)

(52) U.S. Cl.
CPC ......... *B65G 1/1375* (2013.01); *G01C 21/206* (2013.01); *G05B 13/0265* (2013.01);
(Continued)

(58) Field of Classification Search
CPC .... B65G 1/1375; B65G 1/1378; B65G 61/00; G01C 21/206; G05B 13/0265; G05D 1/0212; G05D 1/0251; G05D 1/0287; G05D 1/0297; G05D 2201/0216; G06Q 50/28
See application file for complete search history.

(56) References Cited

U.S. PATENT DOCUMENTS 9,561,941 B1 * 2/2017 Watts .................. G05D 1/0212
9,635,346 B2 * 4/2017 Iida .......................... G06T 7/11
(Continued)

FOREIGN PATENT DOCUMENTS

CN         1541918         11/2004
CN       101657837          2/2010
(Continued)

OTHER PUBLICATIONS

International Preliminary Report on Patentability in International Appln. No. PCT/US2020/027326, dated Oct. 21, 2021, 7 pages.
(Continued)

*Primary Examiner* — Lail A Kleinman
(74) *Attorney, Agent, or Firm* — Fish & Richardson P.C.

(57) ABSTRACT

A layer pick system optimizes usage of a layer picker gantry or robotic arm by arranging and/or displacing the gantry or arm in optimal locations with respect to one or more groups of pallets, and/or by grouping pallets by their attributes and arranging the same group of pallets close to each other. In some implementations, a plurality of pallets is categorized into multiple groups by different velocities.

20 Claims, 21 Drawing Sheets

Related U.S. Application Data

(60) Provisional application No. 62/880,638, filed on Jul. 30, 2019, provisional application No. 62/880,640, filed on Jul. 30, 2019, provisional application No. 62/831,695, filed on Apr. 9, 2019, provisional application No. 62/830,904, filed on Apr. 8, 2019.

(51) Int. Cl.
    *G05B 13/02*     (2006.01)
    *G05D 1/02*     (2020.01)
    *G06Q 50/28*     (2012.01)

(52) U.S. Cl.
    CPC ......... *G05D 1/0212* (2013.01); *G05D 1/0287* (2013.01); *G06Q 50/28* (2013.01); *G05D 2201/0216* (2013.01)

(56) References Cited

U.S. PATENT DOCUMENTS

| | | | |
|---|---|---|---|
| 10,242,273 | B1 | 3/2019 | Eckman |
| 10,399,778 | B1 * | 9/2019 | Shekhawat ............ G06Q 50/28 |
| 10,809,727 | B1 | 10/2020 | Eckman et al. |
| 2011/0218670 | A1 * | 9/2011 | Bell ..................... G05D 1/0246 |
| | | | 700/214 |
| 2013/0177379 | A1 | 7/2013 | Hoffman et al. |
| 2017/0001704 | A1 | 3/2017 | Christenson et al. |
| 2017/0158439 | A1 * | 6/2017 | Miele ................... G06Q 10/087 |
| 2017/0185959 | A1 * | 6/2017 | Meurer ................ B65G 1/1373 |
| 2020/0319648 | A1 | 10/2020 | Eckman |

FOREIGN PATENT DOCUMENTS

| | | |
|---|---|---|
| CN | 108292381 | 7/2018 |
| CN | 108750521 | 11/2018 |
| CN | 108856301 | 11/2018 |

OTHER PUBLICATIONS

International Search Report and Written Opinion in International Application No. PCT/US20/27326, dated Jul. 9, 2020, 9 pages.
Otto Motors, "AGV vs. SDV—A Comparison of Automated Material Transport" Otto Motors, Mar. 2019, 6 pages.
OttoMotors.com [online], "OTTO® SDVs can move that", retrieved on May 14, 2020, retrieved fromURL<https://ottomotors.com/sdvs>, 3 pages.

* cited by examiner

AUTOMATIC TRANSPORTATION OF PALLETS OF GOODS

CROSS-REFERENCE TO RELATED APPLICATIONS

This application is a continuation of U.S. patent application Ser. No. 16/843,772, titled "AUTOMATIC ASSEMBLY OF PALLETS OF GOODS," which was filed on Apr. 8, 2020, which claims priority to U.S. Provisional Patent Application No. 62/830,904, titled "AUTOMATIC ASSEMBLY OF PALLETS OF GOODS," which was filed on Apr. 8, 2019; to U.S. Provisional Patent Application No. 62/831,695, titled "AUTOMATIC TRANSPORTATION OF PALLETS OF GOODS," which was filed on Apr. 9, 2019; to U.S. Provisional Patent Application No. 62/880,638, titled "AUTOMATIC TRANSPORTATION OF PALLETS OF GOODS," which was filed on Jul. 30, 2019; and to U.S. Provisional Patent Application No. 62/880,640, titled "CONTROLLING AUTOMATED PALLET MOVERS," which was filed on Jul. 30, 2019, the entire contents of each of which are hereby incorporated herein by reference.

TECHNICAL FIELD

This document generally describes technology for automatically assembling multiple pallets of goods.

BACKGROUND

Layer picking is a method of picking and moving layers of goods from one pallet to another. Pallets are generally flat transport structures that support goods in a stable manner and that are adapted to fit forklifts and/or other devices/machines to move the pallets. Layer picking is typically performed at a facility to which first pallets bearing homogenous or similar goods are delivered. A layer picking apparatus, such as a forklift or a conveyor belt, is operated to locate a first pallet bearing target goods, pick a layer of target goods from the located first pallet, and move the layer onto a target pallet so that the target pallet bears the target goods with other goods. The target pallet can then be moved to a storage facility or discharged to fulfill an order.

SUMMARY

Some embodiments described herein include a system for automatically assembling multiple pallets of goods using a first device configured to pick layers of goods from pallets and move them over other pallets within an assembly area. In addition, the system includes a second device configured to move pallets of goods into, from, and/or around the assembly area. The first device can be, for example, a gantry or robotic arm configured to pick and move layers of goods over pallets. The second device can be, for example, automated guided vehicles that automatically navigate and are capable of picking up, moving, and dropping off pallets.

Various algorithms can be used to manage and optimize the assembly of multiple pallets within an assembly area. For example, algorithms are configured to define grids on an assembly area so that pallets can be selectively placed in a gridded arrangement on the assembly area. Such algorithms are configured to drive the first device (e.g., a layer picker gantry or robotic arm) to efficiently relocate layers of goods over pallets on the assembly area. Any of a variety of techniques could be used to optimize such operations, like swarm robotic techniques, which can be used to speed up pallet movements and reduce the time it takes to move the pallets. Dynamic paths can be generated to open and/or close routes to provide for optimized movements. The gantry area can be space optimized whereas the areas around it, such as buffer areas, can be speed optimized.

In addition, algorithms are configured to optimize usage of the first device (e.g., a layer picker gantry or robotic arm) by arranging and/or displacing the first device in optimal locations with respect to one or more groups of pallets, and/or by grouping pallets by their attributes and arranging the same group of pallets close to each other. In some implementations, a plurality of pallets is categorized into multiple groups by different velocities (or velocity ranges). A velocity of a pallet can indicate how fast the pallet is palletized or depalletized in an assembly area. Alternatively, a velocity of a pallet can indicate how long the pallet stays in an assembly area (or on its location in the assembly area) before the pallet is removed from the assembly area (or before it is relocated in the assembly area). The groups of pallets having different velocities (or velocity ranges) are arranged on different zones in an assembly area with respect to the first device. For example, slow moving pallets can be arranged in a first zone, while fast moving pallets can be arranged in a second zone around the first zone so that the fast moving pallets are located around a periphery of the first device. This arrangement of pallets can promote fast moving pallets to be removed from the assembly area after palletizing or depalletizing is complete. The first zone can be located at a center of the assembly area and the second zone can be located to surround the first zone. In some implementations, the first device can be located in the first zone. In other implementations, the first device uses a location (e.g., a center) of the first zone as a primary location or reference location for its movement throughout the assembly area. In addition, a third zone may be provided for slower (or absolutely slow) moving pallets that the assembly device does not have to reach as often and/or fast as it does for fast or slow moving pallets. The third zone can be located around a periphery of the assembly area or an area of the assembly area away from the first device.

In addition or alternatively, algorithms can be used to drive the second device (e.g., automated guided vehicles) to automatically navigate within and/or around the assembly area. Such algorithms can optimize a way that the second device picks up a pallet of goods from a supply area, and moves and places the pallet onto the assembly area. For example, the algorithms enable the second device to place the pallet on one of the grids defined in the assembly area in such a way that the second drive can efficiently perform layer picking from/onto all pallets arranged in the assembly area. The algorithms can further optimize a way that the second device picks up a pallet from the assembly area and moves the pallet to an output area (e.g., a discharge area). Some embodiments of the algorithms can be designed to place pallets in a gridded arrangement on an assembly area so as to make every pallet accessible by the second device on the assembly area. For example, pallets are selectively placed in the grids of an assembly area such that at least one path to any of the pallets is available for a second device entering and exiting the assembly area.

The technologies described herein may provide one or more of the following advantages. The system for assembling pallets of goods described herein can replace conventional pallet transportation devices, such as conveyor belt systems and forklifts, by automated guided vehicles to intelligently move pallets of goods into and from an assembly area, thereby reducing operational costs. Pallets of goods are typically transported using multiple conveyor belt systems that are routed from a supply area to an assembly area, and from the assembly area to an output area. Complexity of conveyor belt systems (e.g., a mix of straight and curved configurations) requires costly installation. Further, once installed, conveyor belt systems are fixed and has limited flexibility in modifying paths into and from the assembly area. Moreover, forklifts are human-driven vehicles relying manual operation which is cost-intensive and less optimized. In contrast, automated guided vehicles can provide cost efficient solutions for transporting pallets, and give much more freedom of movement because they are free to move in any available direction and along any available path into and from the assembly area. Further, some algorithms permit for pallets to be grouped by same or similar attributes (e.g., velocity) and arranged so that the same groups of pallets are arranged close to each other for efficient palletizing or depalletizing operation of a assembly device (e.g., a layer picker gantry or robotic arm). Such algorithms can minimize an overall travel distance and movement of the assembly device with respect to pallets in the assembly area, as well as permit for a pallet transportation device (e.g., automated guided vehicles) to carry pallets into or out of the assembly area along shorter routes and in time-saving manners.

In addition or alternatively, some embodiments described herein include a system for transporting pallets in a warehouse using automated guided vehicles, such as in an area between a pallet loading/unloading area and a pallet storage area in the warehouse. A warehouse includes a pallet loading/unloading area where trucks are pulled over so that pallets are unloaded from, or loaded to, the trucks. A warehouse further includes a pallet storage area configured to store pallets in a dense arrangement. For example, the pallet storage area may include multiple-story racks with an elevator system operable to convey pallets to/from different floors of the racks. Typically, a conveyor belt system is used to transport pallets between the pallet loading/unloading area and the pallet storage area. A conveyor belt system includes a complex layout of conveyor belts which has many connection points between conveyor belts and many bottle neck areas where multiple conveyor belts are connected to one conveyor belt. The conveyor belt system operates to convey multiple pallets from different start locations to different end locations at the same time. For example, the pallet loading/unloading area includes a plurality of decks from/to which pallets that are loaded/unloaded to/from truck are carried by workers. Further, the pallet racks have a plurality of columns and rows in multiple levels (heights) from/to which pallets are transported using different elevators. Such a complex conveyor belt system often results in clogging when a large number of pallets are conveyed at the same time between different start locations and end locations. For example, pallets which travel deep in the conveyor belt system can be stuck with other pallets moving along long routes of conveyor belts. Moreover, once the conveyor belts are set up, they are less flexible in creating and modifying paths along which pallets can be carried.

The pallet transportation system described herein uses automated guided vehicles that replace the complex conveyor belt system installed to move pallets in a warehouse. Automated guided vehicles can automatically navigate and are capable of picking up, moving, and dropping off pallets. Algorithms are configured to optimize operation of automated guided vehicles in a warehouse. Algorithms can be used to determine optimal routes of each automated guided vehicle from a start location to an end location. For example, algorithms can be configured to optimize or minimize the number of cross-overs of the routes taken by automated guided vehicles. In addition or alternatively, algorithms can be configured to optimize the timing of operation of respective automated guided vehicles, thereby reducing the likelihood of collision between vehicles. In addition or alternatively, algorithms can be configured to optimize or maximize the speed of respective automated guided vehicles. In addition or alternatively, algorithms can be configured to optimize or minimize the time required to complete a particular project of moving pallets in a warehouse.

The pallet transportation system described herein can replace conventional pallet transportation devices, such as conveyor belt systems, by automated guided vehicles to intelligently move pallets of goods between different locations in a warehouse, thereby optimizing routes and/or timing of pallet transportation, avoiding collision between different pallets being transported, reducing a transportation time, and reducing operational costs. Further, the pallet transportation system can provide great flexibility in managing pallets in a warehouse because automated guided vehicles allow a large number of possible paths between a particular set of start and end locations, as opposed to a conveyor belt system that provides a limited number of possible routes between the start and end locations. The pallet transportation system can provide redundancy in route selection by allowing a large number of route options between particular start and end positions. An optimal route can be selected from such multiple route options to meet different criteria required in managing pallets in a warehouse.

Particular embodiments described herein include a method for automatically assembling pallets of goods. The method may include one of more of the following operations: driving a first automated pallet mover to move to a supply area in which a plurality of pallets are unloaded and positioned; identifying a target supply pallet from the plurality of pallets in the supply area; controlling the first automated pallet mover to grasp the target supply pallet; determining a target supply cell on an assembly area, the assembly area defining a plurality of cells including the target supply cell; determining an optimal inbound path for the first automated pallet mover to reach the target supply cell on the assembly area; driving the first automated pallet mover to move to the target supply cell along the optimal inbound path on the assembly area; controlling the first automated pallet mover to place the target supply pallet on the target supply cell of the assembly area; controlling a layer picking apparatus to palletize and/or depalletize between the target supply pallet and a target output pallet, the target output pallet arranged on a target output cell of the assembly area; determining an optimal outbound path for a second automated pallet mover to reach the target output cell on the assembly area; driving the second automated pallet mover to move to the target output cell along the optimal outbound path on the assembly area; controlling the second automated pallet mover to grasp the target output pallet; and driving the second automated pallet mover to exit the assembly area along the optimal outbound path.

In some implementations, the system can optionally include one or more of the following features. The layer picking apparatus may include a layer picking gantry and/or a robotic arm. The first automated pallet mover and the second automated pallet mover may include automated vehicles. The first automated pallet mover may be the same as the second automated pallet mover. The plurality of cells may be defined in a gridded arrangement on the assembly area. The target supply cell may be determined such that the target supply cell is always accessible by the first automated pallet along at least one path defined through the gridded arrangement of the plurality of cells on the assembly area. The target supply cell for the supply pallet and the target output cell for the output pallet may be determined such that every pallet is always accessible along at least one path defined through the gridded arrangement of the plurality of cells on the assembly area. Determining a target supply cell on an assembly area may include determining that the target supply pallet is a first pallet having one or more layers of goods to be moved onto or out from the first pallets less than a first threshold number of times per a predetermined period of time, and determining the target supply cell in a first zone of the assembly area. Determining a target supply cell on an assembly area may include determining that the target supply pallet is a second pallet having one or more layers of goods to be moved onto or out from the second pallets more than the first threshold number of times per the predetermined period of time, and determining the target supply cell in a second zone of the assembly area, the first zone being at least partially surrounded by the second zone. Determining a target supply cell on an assembly area may include determining that the target supply pallet is a third pallet having one or more layers of goods to be moved onto or out from the third pallets less than a second threshold number of times per the predetermined period of time, the second threshold number of times being smaller than the first threshold number of times; and determining the target supply zone in a third zone of the assembly area, the second zone being at least partially surrounded by the third zone.

Particular embodiments described herein include a method for automatically assembling pallets of goods. The method may include one or more of the following operations: determining a first zone and a second zone in an assembly area, the first zone being at least partially surrounded by the second zone; placing first pallets in the first zone, the first pallets having one or more layers of goods to be moved onto or out from the first pallets less than a first threshold number of times per a predetermined period of time; placing second pallets in the second zone, the second pallets having one or more layers of goods to be moved onto or out from the second pallets more than the first threshold number of times per the predetermined period of time; and controlling a layer picking apparatus to palletize or depalletize among the first pallets and the second pallets.

In some implementations, the system can optionally include one or more of the following features. The method may include determining a third zone in the assembly area, placing third pallets in the third zone, and controlling the layer picking apparatus to palletize or depalletize among the first pallets, the second pallets, and the third pallets. The second zone may be at least partially surrounded by the third zone. The third pallets may have one or more layers of goods to be moved onto or out from the third pallets less than a second threshold number of times per the predetermined period of time. The second threshold number of times may be smaller than the first threshold number of times. Placing first pallets in the first zone may include driving one or more automated pallet movers to move the first pallets from a storage area to the first zone of the assembly area, and driving the automated pallet movers to move the second pallets from the storage area to the second zone of the assembly area. The third zone may be arranged on a periphery of the assembly area. The method may include driving one or more automated pallet movers to move the third pallets between the third zone of the assembly area and a buffer area, the buffer area disposed at least partially around the assembly area. The automated pallet movers may move along straight routes between the third zone of the assembly area and the buffer area. The assembly area may include a plurality of cells in a gridded arrangement. The layer picking apparatus may include a layer picking gantry. The automated pallet movers may include AGV and/or SDV. The method may include driving the automated pallet movers to remove the first pallets from the first zone of the assembly area, and driving the automated pallet movers to remove the second pallets from the second zone of the assembly area.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
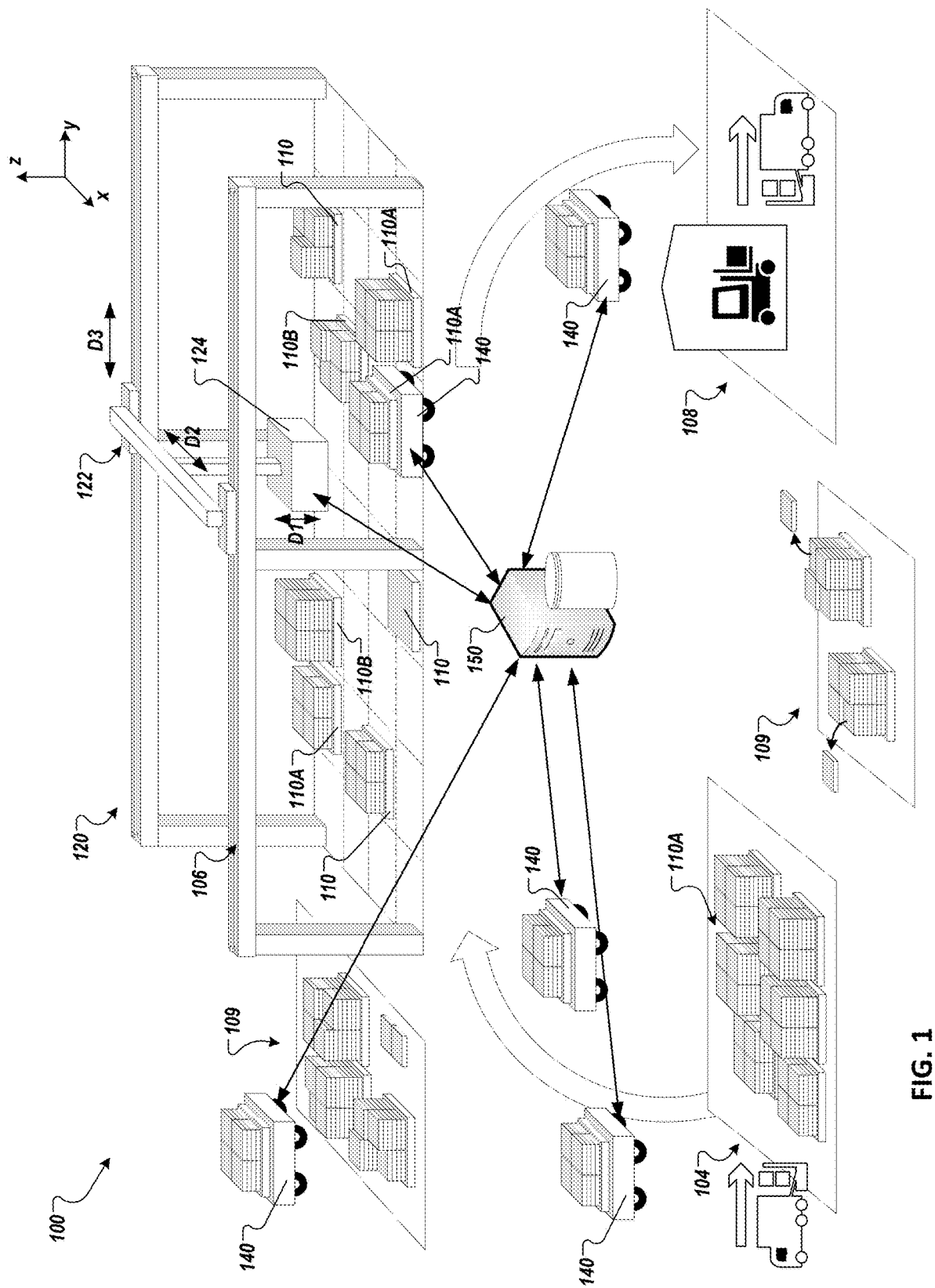
FIG. 1 is a schematic illustration of an example system for automatically assembling multiple pallets of goods.

FIG. 1 is a schematic illustration of an example system 100 for automatically assembling multiple pallets of goods. The system 100 may be implemented in a warehouse 102, such as a storage warehouse, a distribution center, a retail warehouse, a cold storage warehouse, an overseas warehouse, a packing warehouse, a railway warehouse, a canal warehouse, and other types of warehouses or facilities. The system 100 includes several areas for arranging pallets, such as a supply area 104, an assembly area 106, an output area 108, and a case pick area 109. In some implementations, two or more of the areas 104, 106, 108, and 109 can be at least partially overlap.

The supply area 104 provides an area in which pallets 110 are temporarily placed until they are transported to the assembly area 106. In this document, the pallets 110 arranged on the supply area 104 may be also referred to as supply pallets 110A. The supply area 104 may be a predetermined area of the warehouse 102, and/or another warehouse remote from the warehouse 102 of the system 100. In some implementations, trucks and other vehicles can transport the pallets 110 to the supply area 106.

The assembly area 106 provides an area in which goods supported on pallets 110 (including 110A and 110B) are palletizing and depalletizing. For example, layers of goods supported on pallets 110 in the assembly area 106 can be moved and/or rearranged between the pallets 110. In addition or alternatively, layers of goods supported on the pallets 110 in the assembly area 106 can be moved to empty pallets 110 in the assembly area 106 to create new pallets of goods.

For example, when the supply pallets 110A are delivered from the supply area 104 to the assembly area 106, layers of goods on the supply pallets 110A can be picked up, and moved onto one or more other pallets which will be discharged to the output area 108. Such other pallets may be also referred to herein as output pallets 110B in this document.

The system 100 includes a layer picking apparatus 120 configured to lift, move, and drop layers of goods over pallets, thereby building desired pallets bearing layers of goods from different pallets. The layer picking apparatus 120 can be configured to automatically identify a pallet of desired goods, lift one or more layers of goods from the pallet, and move and drop the layers onto a target pallet.

The layer picking apparatus 120 can include a layer picking gantry 122 as illustrated in FIG. 1. The layer picking gantry 122 is built over the assembly area 106 and includes a layer grasping tool 124 configured to grasp and release one or more layers of goods using, for example, clamping and/or suction force. The layer picking gantry 122 includes a tool drive mechanism configured to move the layer grasping tool 124 vertically up and down (e.g., along direction D1 along axis Z), move it along a width of the assembly area (e.g., along direction D2 along axis X), and move it along a length of the assembly area (e.g., along direction D3 along axis Y).

Alternatively or in addition, the layer picking apparatus 120 can include a robotic arm having a layer grasping tool at its distal end. The robotic arm can be positioned at a fixed location on the assembly area 106, such as a center of the assembly area 106, from which the robotic arm can reach all or some of pallets arranged therearound in the assembly area 106. Alternatively, the robotic arm can be configured to be movable along one or more guide rails, or freely, in the assembly area 106.

Alternatively or in addition, any other suitable devices for automated layer picking operations can be used for the layer picking apparatus 120. For example, in some implementations, the layer picking apparatus 120 can include automated vehicles dedicated or specifically designed for layer picking.

The output area 108 provides an area in which the pallets 110, such as output pallets 110B, which have been transported out from the assembly area 106 are arranged. The output area 108 may be a predetermined area of the warehouse 102, and/or another warehouse remote from the warehouse 102 of the system 100. In some implementations, trucks and other vehicles can transport the pallets 110 (e.g., output pallets 110B) out from the output area 108.

The case pick area 109 provides an area in which case picking may be performed. Cases can be transported from and into, or relocated within, the case pick area 109 manually and/or using automated equipment, such as conveyor belt systems, automated vehicles (e.g., AGVs and/or SDVs), gantries, robotic arms, and other suitable vehicles (e.g., forklifts, etc.) or devices.

Referring still to FIG. 1, the system 100 can further include one or more pallet movers 140 configured to pick up, carry, and drop pallets 110. The pallet movers 140 can be configured to automatically move within the warehouse 102, such as within the supply area 104, between the supply area 104 and the assembly area 106, within the assembly area 106, between the assembly area 106 and the output area 108, and within the output area 108.

In some implementations, the pallet movers 140 include automated guided vehicles (automated vehicles). Examples of such automated vehicles include automated guided vehicles (AGVs) and self-driving vehicles (SDVs). For example, an automated vehicle can be configured to be an AGV which is a portable robot that can automatically move and perform several tasks by following predetermined instructions with minimal or no human intervention. An automated vehicle are computer-controlled, unmanned electric vehicle controlled by pre-programmed software to move pallets around a warehouse. Automated vehicles are freely moveable. Alternatively or in addition, automated vehicles can work with guidance devices, such as magnetic tapes, beacons, barcodes, or predefined laser paths that allow the automated vehicles to travel on fixed or variable paths in a controlled space. Example guidance devices include marked lines or wires on the floor, and/or guidance by using radio waves, vision cameras, magnets, lasers, and/or other technologies for navigation. Automated vehicles can include lasers and/or sensors configured to detect obstacles in its path and trigger them to stop automatically.

In addition or alternatively, automated vehicles can be configured to be SDVs which autonomously move and perform functions in a warehouse. For example, automated vehicles are configured to automatically make decisions when faced with new or unexpected situations. Automated vehicles are further configured to learn as they encounter new situations. Automated vehicles can be configured to operate without direct driver input or pre-configured scripts to control steering, acceleration, and braking. Automated vehicles can use laser-based perception and navigation algorithms to dynamically move through the area in a warehouse. In some implementations, automated vehicles include onboard intelligence to adapt to changing environments. Further, machine learning capabilities can be used to enable automated vehicles to become efficient and accurate as they encounter new or unexpected situations. Data can be collected for machine learning which can update a warehouse map (which maps the warehouse and includes zones and points of interest) with learned parameters. Automated vehicles can be configured to learn which routes are the fastest and take optimal paths, even within unpredictable environments. Multiple automated vehicles can collaboratively interact with other automated vehicles. In some examples, automated vehicles do not require external infrastructure for navigation, making implementation hassle-free and highly scalable. Automated vehicles can be configured to detect, avoid, and dynamically move around obstacles (including other automated vehicles) to continue to destination, reducing downtime. Parameters associated with automated vehicles can be customized to navigate through aisleways, personnel zones, narrow corridors, and other regions.

Referring still to FIG. 1, the system 100 includes a computing device 150 for controlling pallet assembly and/or transportation in the warehouse 102. Although a single computing device 150 is illustrated and primarily described herein, multiple computing devices can be configured to perform same or similar functions. The computing device 150 is configured to communicate with the layer picking apparatus 120 (e.g., a layer picker gantry or robotic arm) and/or the one or more pallet movers 140 (e.g., automated guided vehicles), and manage and optimize transportation and/or assembly of pallets in the warehouse 102.

Figure 2:
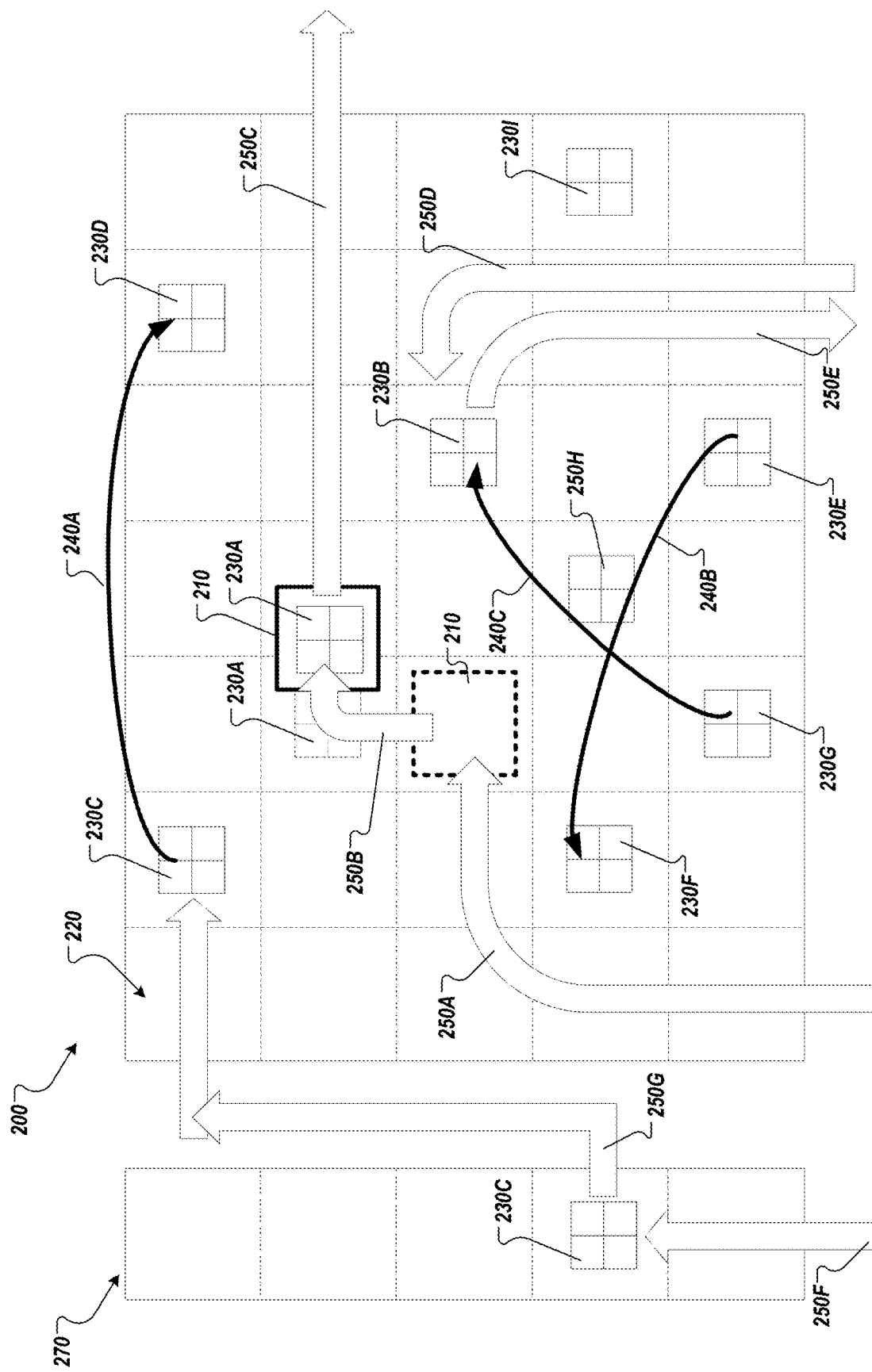
FIG. 2 illustrates a schematic plan view of an example assembly area.

FIG. 2 illustrates a schematic plan view of an example assembly area 200. In some implementations, the assembly area 200 can represent the assembly area 106 of FIG. 1. The assembly area 200 can be managed by one or more computing devices, such as the computing device 150, the computing device of the layer picking apparatus 120, and/or the computing device of each pallet mover 140 of FIG. 1, which run one or more algorithms for managing and optimizing the assembly of multiple pallets within the assembly area 200. Various algorithms can be used for optimization of pallet transportation and/or assembly in the assembly area 200 (and/or a temporary pallet area 270 as described below). Example algorithms are described below, for example, with regard to FIGS. 7A-F.

In some implementations, such algorithms can define cells 220 in the assembly area 200 that are configured to permit for pallets 230 (including 230A-I) to be placed thereon. In the illustrated example, the cells 220 are defined as grids and arranged in a gridded arrangement. Alternatively or in addition, other shapes, such as circles and polygons, are possible for the cells 220.

The algorithms are configured to drive a first device, such as the layer picking apparatus 120, to relocate (e.g., palletizing and depalletizing) layers of goods from one pallet to another in the assembly area 200. In FIG. 2, for example, the first device can lift a layer of goods from a pallet 230C, move the layer, and place it on a pallet 230D (process 240A). Similarly, the first device can move a layer of goods from a pallet 230E to a pallet 230F (process 240B), and a layer of goods from a pallet 230G to a pallet 230B (process 240C).

The algorithms can further be configured to drive a second device, such as one or more pallet movers 140, to automatically navigate within and/or around the assembly area 200. The algorithms are configured to optimize a way that the second device picks up a pallet from a supply area (e.g., the supply area 104), and moves and places the pallet onto the assembly area 200. For example, the algorithms can enable the second device to determine an optimal path to reach a target cell to place a pallet on the assembly area and move to the target cell with the pallet. In addition or alternatively, the algorithms can enable the second device to place the pallet 230 (including 230A-I) on one of the cells 220 defined in the assembly area in such a way that the second drive can efficiently perform layer picking from/onto some or all pallets arranged in the assembly area. The algorithms can be configured to drive the second device to avoid interfering with the operation of the first device (e.g., the layer picking apparatus 120), so that the first device can continue to operate for palletizing and depalletizing the pallets while the second device moves in the assembly area 200. Further, the algorithms can determine one of the cells 220 to place a particular pallet 230, which will allow a shortest entering route, optimal layer picking, and/or avoiding interference of the second device with the operation of the first device.

In addition or alternatively, the algorithms can optimize a way that the second device picks up a pallet 230 (including 230A-I) from the assembly area 200 and moves the pallet 230 to an output area (e.g., the output area 108). For example, the algorithms can enable the second device to determine an optimal path to access a target pallet and remove it from the assembly area 200. In addition or alternatively, the algorithms can drive the second device to access and move the pallet without intervening the movement of the first device performing layer picking. The algorithms can further permit for the second device to enter the assembly 200, lift the pallet, move it out of the assembly area 200, along the optimal path. In FIG. 2, for example, paths 250A-C are determined as a shortest exit route for a second device 210 (e.g., the pallet mover 140) to access the pallet 230A and remove it from the assembly area 200. Further, the paths 250A-C can be determined such that the movement of a second device 210 does not interfere with the operation of the first device on the assembly area 200 during the movement of the second device 210.

In addition or alternatively, the algorithms can be designed to place pallets in the cells 220 on the assembly area 200 so as to make every pallet accessible by the second device on the assembly area 200. For example, all pallets are placed in the cells 220 of the assembly area 200 such that at least one path to any of the pallets is available for the second device entering and exiting the assembly area 200.

In some implementations, the assembly area 200 can be accompanied by a temporary pallet area 270. The temporary pallet area 270 can be arranged close to the assembly area 200. The temporary pallet area 270 provides an area on which one or more pallets are temporarily placed before moved to the assembly area 200 or other areas, such as the supply area 104, the output area 108, and the case pick area 109. In addition or alternatively, the case pick area 109 can function as the buffer area and therefore as an area to which pallets can be transported. In FIG. 2, for example, a pallet 230C may be moved from another area (e.g., the supply area 104) along a path 250F, and temporarily placed in the temporary pallet area 270 before it is moved to the assembly area 200. For example, the pallet 230C can be placed in the temporary pallet area 270 until one of the cells 220 becomes available which is optimal for pallet arrangement in the assembly area 20 and operation of layer picking with respect to the pallet 230C thereon. Once the optimal cell is available, the pallet 230C is moved to that cell along a path 250G.

The technology described herein includes one or more of the following processes: (1) driving a first automated pallet mover to move to a supply area in which a plurality of pallets are unloaded and positioned, (2) identifying a target supply pallet from the plurality of pallets in the supply area, (3) controlling the first automated pallet mover to grasp the target supply pallet, (4) determining a target supply cell on an assembly area, the assembly area defining a plurality of cells including the target supply cell, (5) determining an optimal inbound path for the first automated pallet mover to reach the target supply cell on the assembly area, (6) driving the first automated pallet mover to move to the target supply cell along the optimal inbound path on the assembly area, (7) controlling the first automated pallet mover to place the target supply pallet on the target supply cell of the assembly area, (8) controlling a layer picking apparatus to palletize and/or depalletize between the target supply pallet and a target output pallet, the target output pallet arranged on a target output cell of the assembly area, (9) determining an optimal outbound path for a second automated pallet mover to reach the target output cell on the assembly area, (10) driving the second automated pallet mover to move to the target output cell along the optimal outbound path on the assembly area, (11) controlling the second automated pallet mover to grasp the target output pallet, and (12) driving the second automated pallet mover to exit the assembly area along the optimal outbound path. In certain examples, the layer picking apparatus includes a layer picking gantry and/or a robotic arm. In certain examples, the first automated pallet mover and the second automated pallet mover include automated guided vehicles. In certain examples, the first automated pallet mover is the same as the second automated pallet mover. In certain examples, the plurality of cells are defined in a gridded arrangement on the assembly area. In certain examples, the target supply cell is determined such that the target supply cell is always accessible by the first automated pallet along at least one path defined through the gridded arrangement of the plurality of cells on the assembly area. In certain examples, the target supply cell for the supply pallet and the target output cell for the output pallet are determined such that every pallet is always accessible along at least one path defined through the gridded arrangement of the plurality of cells on the assembly area.

Figure 3:
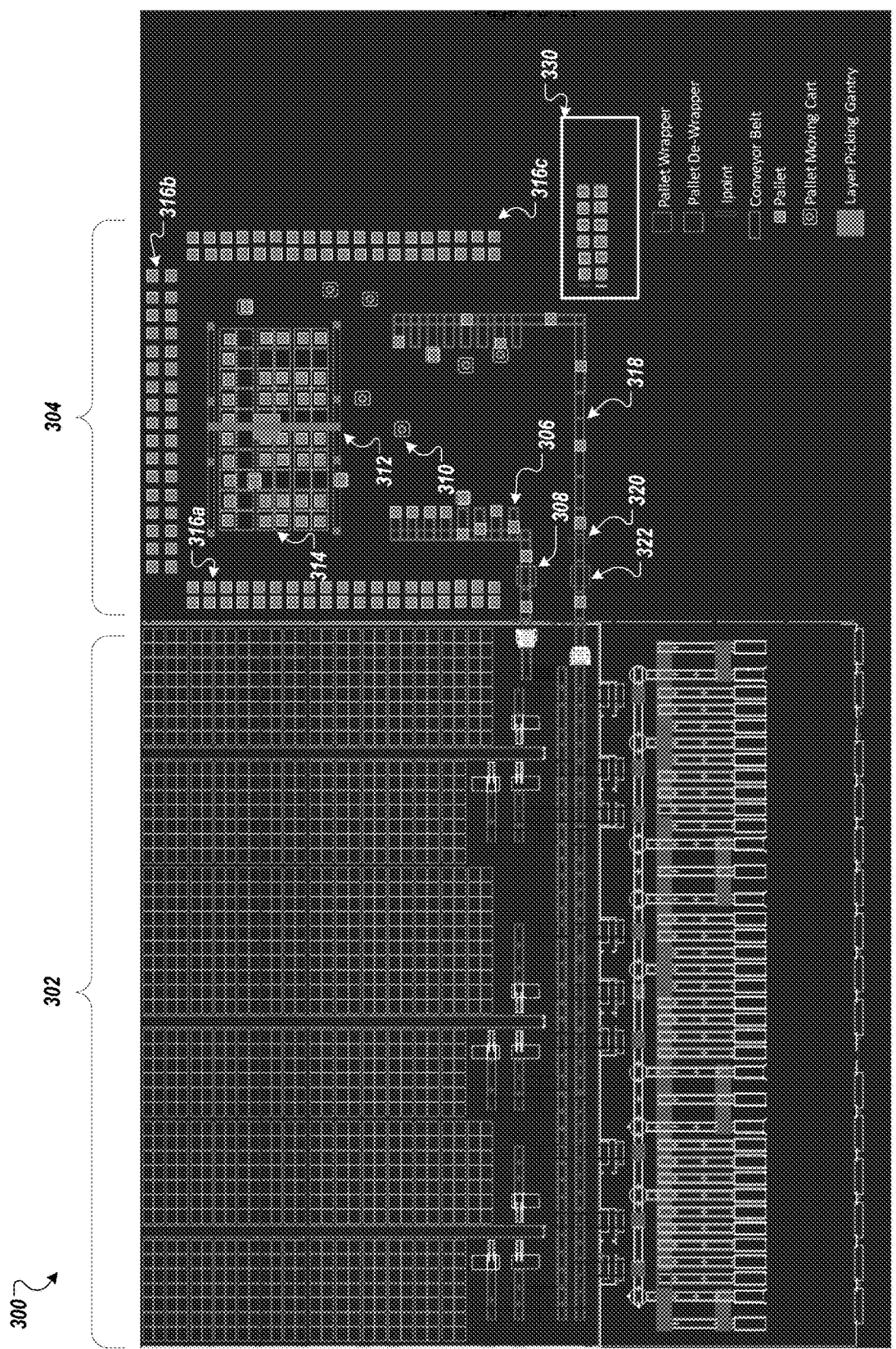
FIG. 3 depicts an example system for automatically assembling pallets of goods in an example warehouse environment.

FIG. 3 depicts an example system 300 for automatically assembling pallets of goods in an example warehouse environment. The system 300 can be similar to the systems 100 and 200 described above with regard to FIGS. 2 and 3 above.

The example warehouse in the example system 300 includes a warehouse area 302 and an automated pallet assembly area 304. The warehouse area 302 includes, for example, storage racks for pallets, features to move pallets and out of storage racks (e.g., conveyor belts), a staging area to move pallets in and out of trucks, and/or other features. The warehouse area 302 can be, for example, an automated warehouse using automated features to store and retrieve pallets, such as conveyor belts and/or automated vehicles. Alternatively, the warehouse area 30 can be a manually operated warehouse using, for example, forklifts operated by workers.

The pallet assembly area 304 includes features described throughout this document to automatically build pallets using a layer picking gantry device 312 and automated vehicles 310 to position and move pallets throughout the pallet assembly area 304. In the depicted example, pallets enter the pallet assembly area 304 from the warehouse area 302 via a conveyor belt 306 that includes a pallet de-wrapping device 308 that is configured to remove wrapping (e.g., cellophane wrapping, shrink wrap) from the pallets so that layers can be picked by the layer picking gantry 312. The de-wrapping device 308 can include, for example, a first mechanism to cut the wrap around the pallet (e.g., laser, blade) and a second mechanism to grab and pull the wrap from around the pallet (e.g., robotic arms). The de-wrapping device 308 can be automated and can perform the pallet de-wrapping with little or no human direction. For example, the de-wrapping device 308 can use cameras and/or lasers to optically analyze of the pallets to identify the physical dimensions and shape of the pallet, and to perform its operations without damaging the pallet and/or its contents. Alternatively or in addition, a pallet de-wrapping can be manually performed.

Once inside the pallet assembly area 304, the automated vehicles 310 can move the pallets to various locations throughout the area 304, including in buffer areas 316a-c that are around the layer picking gantry device 312 and within the layer pick area 314 for the gantry device 312. The buffer area 316a-c can be for storage of pallets that are not currently being used to assemble pallets, but which will be used to assemble pallets in the future. The layer pick area 314 is where pallets from which layers are currently being picked and/or pallets that are currently being assembled (e.g., pallets that are receiving layers picked from other pallets) are positioned. An automated control system can be used to identify the pallets to be included in the picking area 314 and the buffer areas 316a-c and the positioning of the pallets within those respective areas, and to translate those determinations into actionable control signals transmitted to the automated vehicles for moving pallets throughout the area 304. Such an example control algorithm is described below with regard to FIGS. 7A-E.

Once a pallet has been assembled (or is otherwise determined to no longer be needed in the area 304), the pallet can be transported to an outbound conveyor belt 318 to transport the pallet out of the area 304. Along the conveyor belt 318 there can be a profiling device 320 that can automatically scan and analyze the pallet, such as determining the dimensions of the pallet and determining that the pallet is structurally sound (e.g., less than a threshold amount of lean for the stacked goods on the pallet). Once a pallet passes the profiling device 320, it can be wrapped by a pallet wrapping device 322, which can automatically wrap the pallet in wrapping material (e.g., cellophane wrap, shrink wrap).

In some implementations, the pallet assembly area 304 can include a case pick area 330 similar to the case pick area 109 in FIG. 1. Although not specifically illustrated in FIG. 3, cases can be transported to/from the case pick area 330 using automated transportation equipment, such as conveyor belts 318 and/or automated vehicles 310. Manual picking and transporting can also be used within the case pick area 109 or onto/from the automated transportation equipment.

Figure 4A:
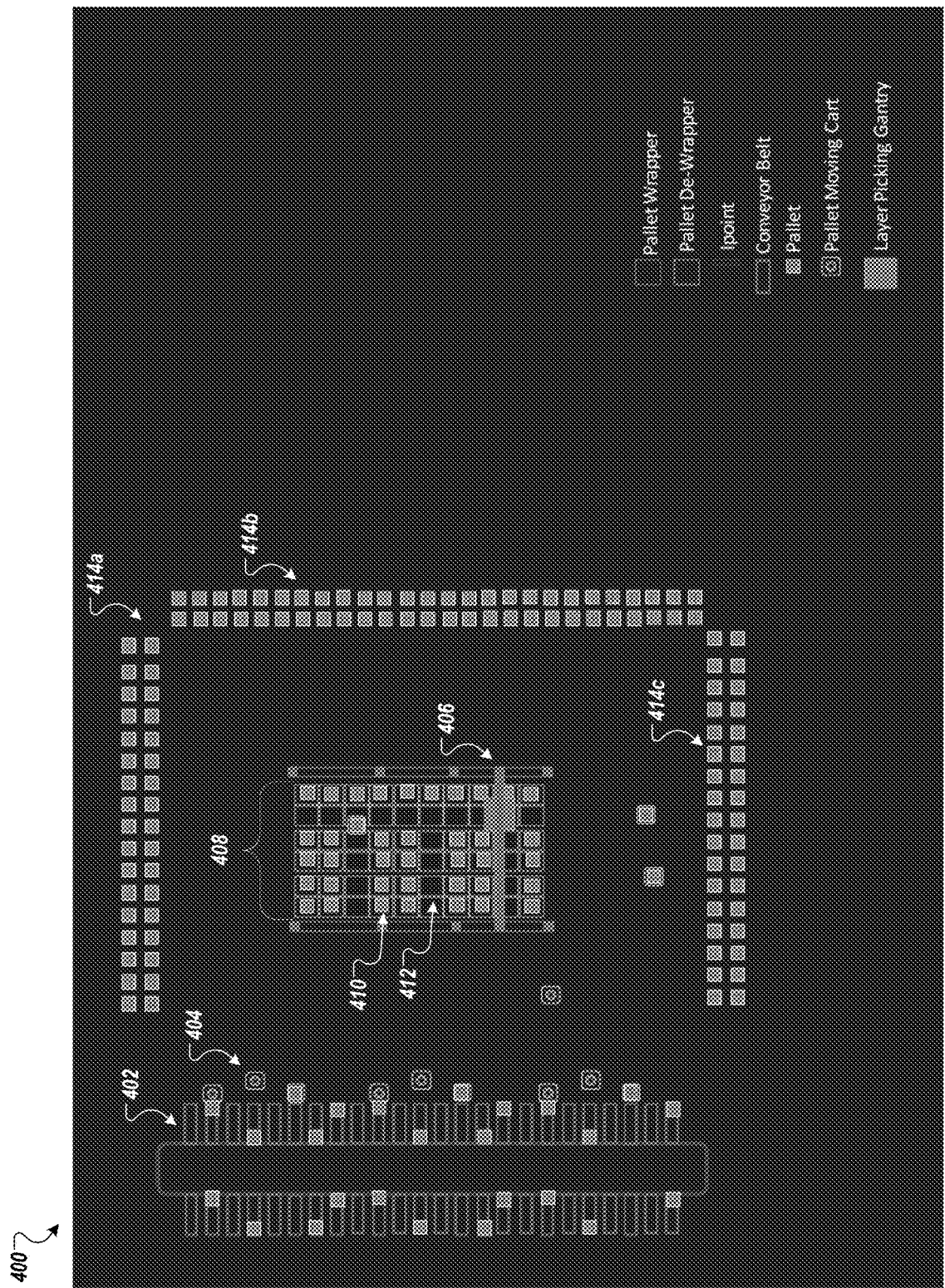
FIG. 4A depicts another example system for automatically assembling pallets of goods in an example warehouse environment.

FIG. 4A depicts another example system 400 for automatically assembling pallets of goods in an example warehouse environment. The system 400 can be similar to the systems 100, 200, and 300 described above with regard to FIGS. 1, 2, and 3 above.

The example system 400 includes a common conveyor belt 402 to bring pallets into and to transport pallets out of the assembly area, which includes the pallet assembly area 408 and the buffer areas 414a-c around the layer picking gantry device 406. The spacing and positioning of the areas 408 and 414a-c can be designed and maintained so that automated vehicles 404 are able to access each pallet in the area without having to first move other pallets. This includes maintaining pathways 412 within the area 408 so that pallets (e.g., pallet 410) within the area 408 can be accessed without first having to move other pallets. Similarly, the buffer areas 414a-c can be designated and maintained such that pallets can readily be accessed, added to, and removed from the buffer areas 414a-c without having to move other pallets.

Figure 4B:
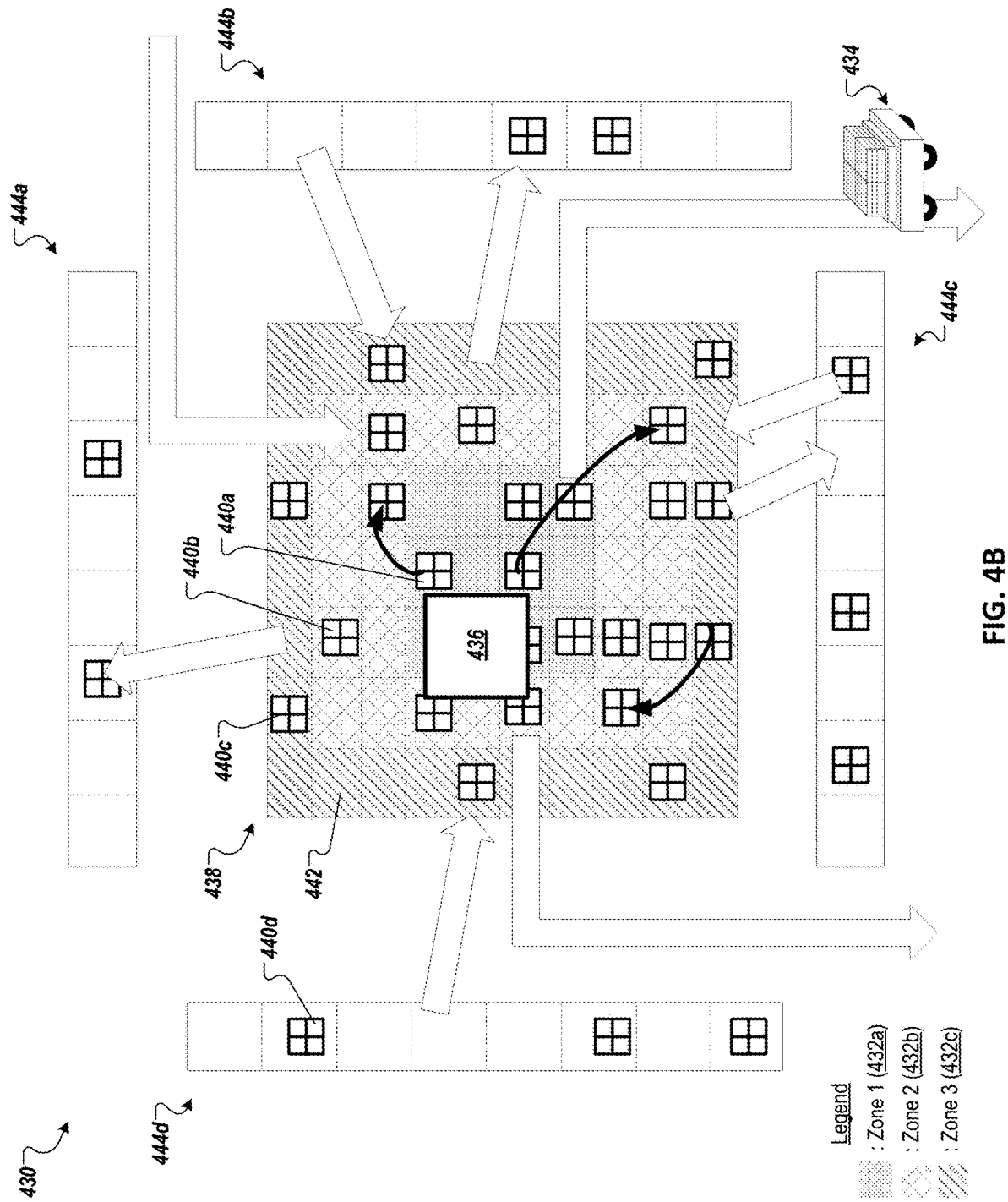
FIG. 4B illustrates an example system for automatically assembling pallets of goods in an example warehouse environment.

FIG. 4B illustrates an example system 430 for automatically assembling pallets of goods in an example warehouse environment. The system 430 can be similar to the systems 100, 200, 300, and 400 described above with regard to FIGS. 1, 2, 3, and 4A above. The system 430 includes an assembly device 436, an assembly area 438 and one or more buffer areas 444a-d (collectively 444). As described herein, the pallets in the system 430 can be transported using one or more automated vehicles 434 (e.g., AGVs, SDVs, or other suitable vehicles). The assembly device 436 can be a layer picking gantry device, a robotic arm, or other device suitable for palletizing or depalletizing process. The assembly device 436 can be located at a center of the assembly area 438, or configured to have the center of the assembly area 438 as a primary location (or reference location) at which the assembly device 436 is positioned at default, substantially passes through in operation, or refers to when determining routes to travel or move over the assembly area 438.

The assembly area 438 can include a plurality of zones 432*a-c* (collectively 432) for arranging different groups of pallets thereon for layer picking operations. The plurality of zones 432 can be arranged with respect to a center of the assembly area 438. In some implementations, a first zone 432*a* (Zone 1) is arranged at the center of the assembly area 438 and a second zone 432*b* (Zone 2) is arranged to surround the first zone 432*a*. For example, at least some of the zones 432 can be arranged coaxially. In some implementations, the assembly area 438 includes a plurality of cells 442 in a gridded arrangement, each of which is configured to permit for a pallet to be placed thereon. Each of the zones 432 can include one or more cells, and the cells of the first zone 432*a* are grouped and arranged at the center of the assembly area 438 while the cells of the second zone 432*b* are grouped and arranged to surround the cells of the first zone 432*a*. For a simple example, where the assembly area 438 includes 9 cells in a 3×3 grid, the first zone 432*a* can be the center cell, and the second zone 432*b* includes 8 cells that surrounds the center cell.

The plurality of pallets 440 can be categorized into multiple groups of pallets by their attributes, and such groups of pallets can be located in different zones of the assembly area 438 in a way to optimize usage of the assembly device 436 and/or the automated vehicles 434, and increase efficiency in operating the assembly device 436 and/or the automated vehicles 434. In some implementations, a plurality of pallets 440 can be categorized into multiple groups of pallets 440*a-c* by their velocities or ranges of velocity. For example, a velocity of a pallet can represent how fast the pallet is palletized or depalletized in an assembly area, or represent how long the pallet stays in an assembly area (or on its location in the assembly area) before the pallet is removed from the assembly area (or before it is relocated in the assembly area). The velocity of a pallet increases as the pallet is palletized or depalletized faster, or as the pallet stays in an assembly area (or on its location in the assembly area) for a shorter period of time. Alternatively, a velocity of a pallet can represent how many layers of goods are moved onto or out from the pallets per a predetermined period of time. Thus, the velocity of a pallet increases as more layers of goods are moved onto or out from the pallet over a period of time.

For example, a plurality of pallets can be grouped into first velocity pallets 440*a* and second velocity pallets 440*b*. The first velocity pallets 440*a* are pallets having a first velocity or within a first velocity range, and the second velocity pallets 440*b* are pallets having a second velocity or within a second velocity range. By way of example, the first velocity pallets 440*a* (e.g., slow speed pallets or slow moving pallets) can have one or more layers of goods to be removed onto or out from the pallets more than a first threshold number of times per a predetermined period of time, and the second velocity pallets 440*b* (e.g., high speed pallets or fast moving pallets) can have one or more layers of goods to be removed onto or out from the pallets less than the first threshold number of times per the predetermined period of time. In the illustrated example, the first velocity pallets 440*a* can be arranged in the first zone 432*a* (Zone 1), and the second velocity pallets 440*b* can be arranged in the second zone 432*b* (Zone 2). This arrangement can permit for the second velocity pallets 440*b* (e.g., high speed pallets or fast moving pallets) to be introduced into and removed from the assembly area more quickly than the first velocity pallets 440*a* (e.g., low speed pallets or slow moving pallets), after palletizing or depalletizing is complete.

In addition, the assembly area 438 can further include a third zone 432*c* (Zone 3) which is arranged to surround the second zone 432*b*. For example, the cells of the third zone 432*c* are grouped and arranged to surround the cells of the second zone 432*b*. In some implementations, the third zone 432*c* is arranged at a periphery of the assembly area 438, as illustrated in FIG. 4B. The third zone 432*c* is used for pallets (e.g., slower or absolutely slow pallets) that the assembly device do not have to reach as often and/or fast as it does for fast or slow moving pallets. For example, some of the plurality of pallets can be grouped into third velocity pallets 440*c* having a third velocity or a third velocity range. For example, the third velocity pallets 440*c* (e.g., slower/slowest speed pallets or slower/slowest moving pallets) can have one or more layers of goods to be moved onto or out from the pallets less than a second threshold number of times per the predetermined period of time, and the second threshold number of times is smaller than the first threshold number of times described above. In some implementations, the third zone 432*c* is configured to have a single line of cells 442 around the periphery of the assembly area 438.

Although this example illustrates three different zones on the assembly area, it is understood that the assembly area can have two different zones or more than three different zones in similar manners.

In some implementations, the assembly area 438 can be accompanied with the buffer areas 444 that are designated and maintained such that pallets can be readily accessed, added to, and removed from the buffer areas 444. The buffer areas 444 can be used to stage pallets 440*d* that are to be transported into the assembly area 438 shortly or as soon as cells for the pallets 440*d* become available in the assembly area 438. For example, the buffer areas 444 can be used to buffer with pallets that are less frequently used (e.g., single use or only a few uses in a day). In alternatively examples, when more SKUs (stock keeping units) are needed than the assembly area can accommodate, the buffer areas 444 can be used to buffer those SKUs until they can be picked. In examples where two SKUs are needed but there is only one spot available in the assembly area, pallets for such SKUs can be arranged in the assembly area and the buffer areas, and the assembly device (e.g., gantry device, robotic arms, etc.) and/or the automated vehicles (e.g., AGVs, SDVs, etc.) can build the pallets at the same time both in the assembly area and the buffer areas, or build the pallets in sequence or alternatingly in the assembly area and the buffer areas.

The buffer areas 444 and the assembly area 438 are configured such that pallets can be transported from the buffer areas 444 to the assembly area 438, and/or from the assembly area 438 to the buffer areas 444, along optimal paths, such as shortest possible routes therebetween, for efficient transportation of pallets. For example, transportation paths between the assembly area 438 and the buffer areas 444 can be straight routes.

Figure 4C:
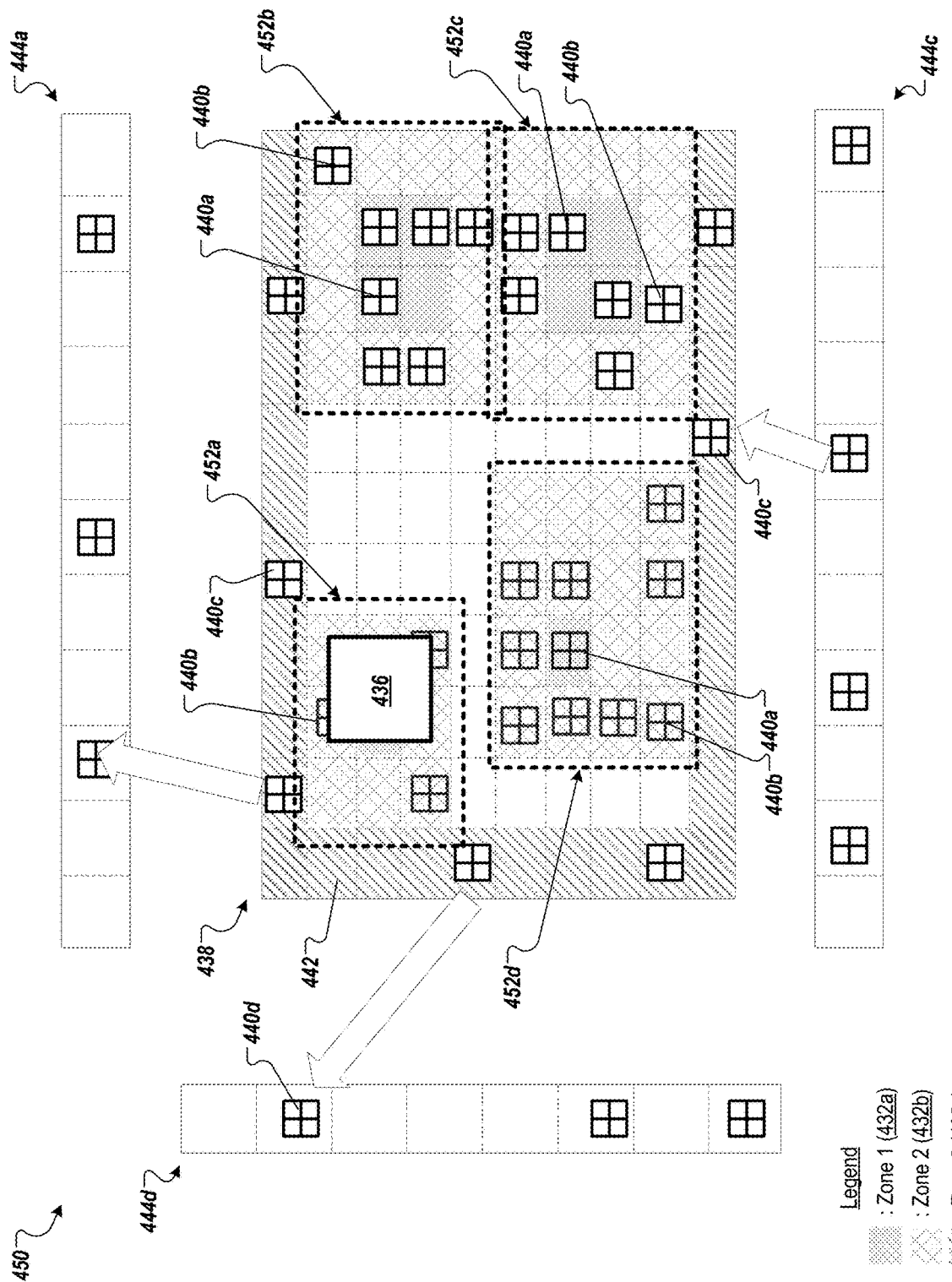
FIG. 4C illustrates an example system for automatically assembling pallets of goods in an example warehouse environment.

FIG. 4C illustrates an example system 450 for automatically assembling pallets of goods in an example warehouse environment. The system 450 can be similar to the system 430 in FIG. 4B, and further similar to the systems 100, 200, 300, and 400 described above with regard to FIGS. 1, 2, 3, and 4A above. To the extent reasonable, the same or similar reference numbers are used for the same or similar elements in FIGS. 4B and 4C. Similarly to the system 430, the system 450 includes the assembly device 436, the assembly area 438 and the buffer areas 444a-d (collectively 444). In the system 450, the assembly area 438 can include a plurality of subareas 452a-d (collectively 452), each of which can include a plurality of zones 432 for different groups of pallets 440 as described in FIG. 4B. For example, each of the subareas 452 can include first and second zones 432a-b for pallets 440a-b having different velocities. In some implementations, the assembly device 436 can perform layer picking operations for the subareas 452 one-by-one. In other implementations, the assembly device 436 can perform layer picking operations for the subareas 452 in alternating manners. In yet other implementations, a plurality of assembly devices can be used to perform layer picking operations on the subareas 452 in parallel.

In addition, each of the subareas 452 can include the third zone 432c in the same or similar manner as described in FIG. 4B (e.g., the third zone 432c is arranged at a periphery of the subarea 452). Alternatively or in addition, the third zone 432c can be arranged at a peripheral of the entire assembly area 438 as illustrated in FIG. 4C.

Figure 5:
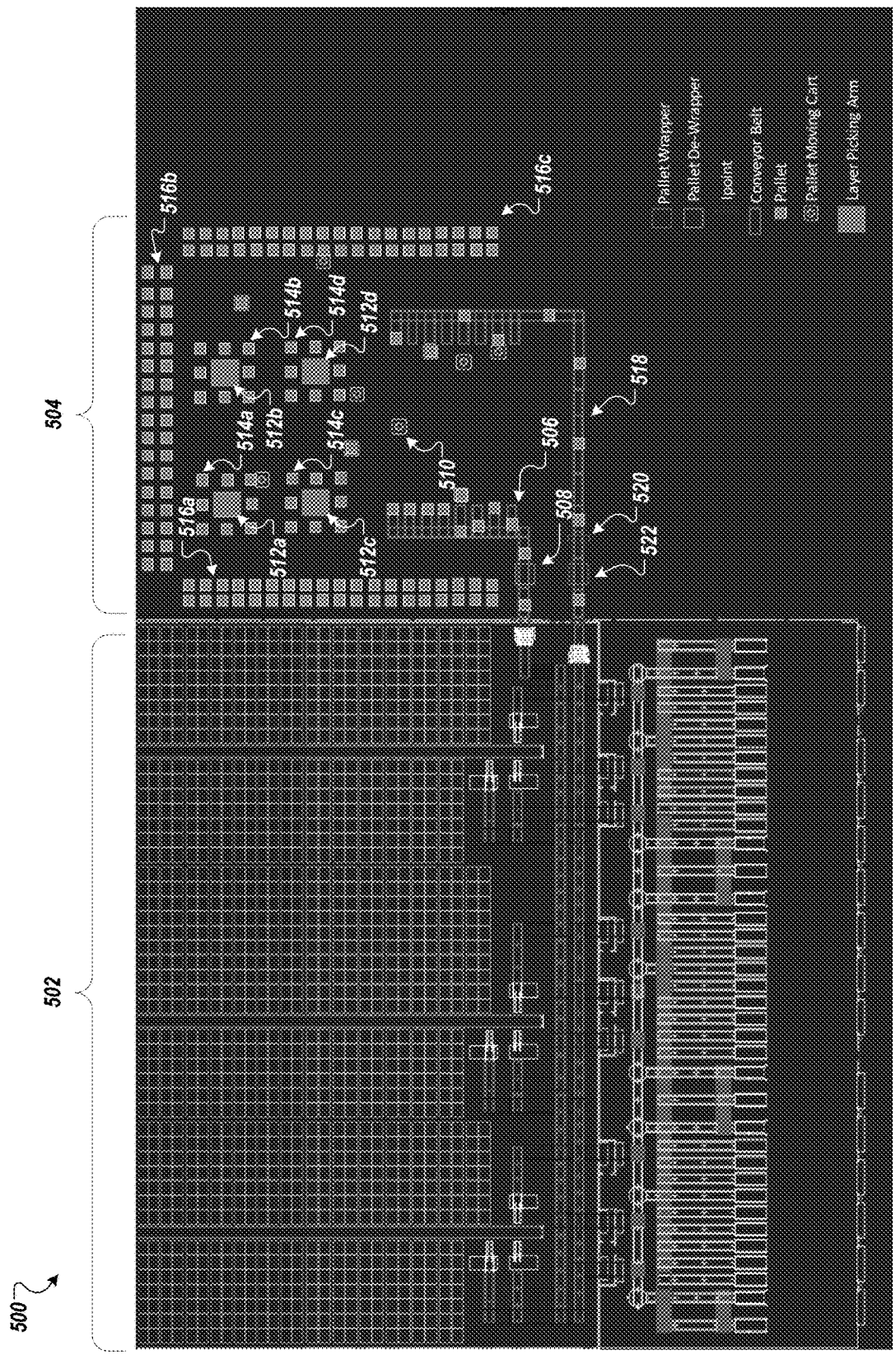
FIG. 5 depicts another example system for automatically assembling pallets of goods in an example warehouse environment.

FIG. 5 depicts another example system 500 for automatically assembling pallets of goods in an example warehouse environment. The system 500 can be similar to the systems 100, 200, 300, and 400 described above with regard to FIGS. 2, 3, 4, and 5 above.

The system 500 includes a similar layout and design to the system 300, with a warehouse area 502, a pallet assembly area 504, conveyor belt 506 and pallet de-wrapping device 508 to transport and prepare pallets for disassembly/assembly, automated vehicles 510, buffer areas 516a-c, and a conveyor belt 518 to transport pallets out of the area 504 along with a pallet profiler 520 and a pallet wrapping device 522. The main difference between the system 300 and the system 500 is that, instead of using a layer pick gantry device 312 as in system 300, multiple layer picking arms 512a-d are used in the system 300. The layer picking arms 512a-d can be fixed to a position in the area 504 (e.g., fixed to the ground, fixed to the ceiling, fixed to a wall) and, as a result, may not be able to reach as many pallets to pick from as the layer pick gantry device 312, which can move along rails in multiple dimensions (as described above). Accordingly, multiple layer picking arms 512a-d may be used (or a single layer picking arm can be used, as well). Pallets can be arranged in picking areas 514a-d that correspond to each of the layer picking arms 512a-d. As discussed above, the positioning of pallets within the picking areas 514a-d and the buffer areas 516a-c can be designed so that the automated vehicles 510 can access each pallet without having to move other pallets, which can include leaving pathways around and within each area so that each pallet is accessible.

Figure 6:
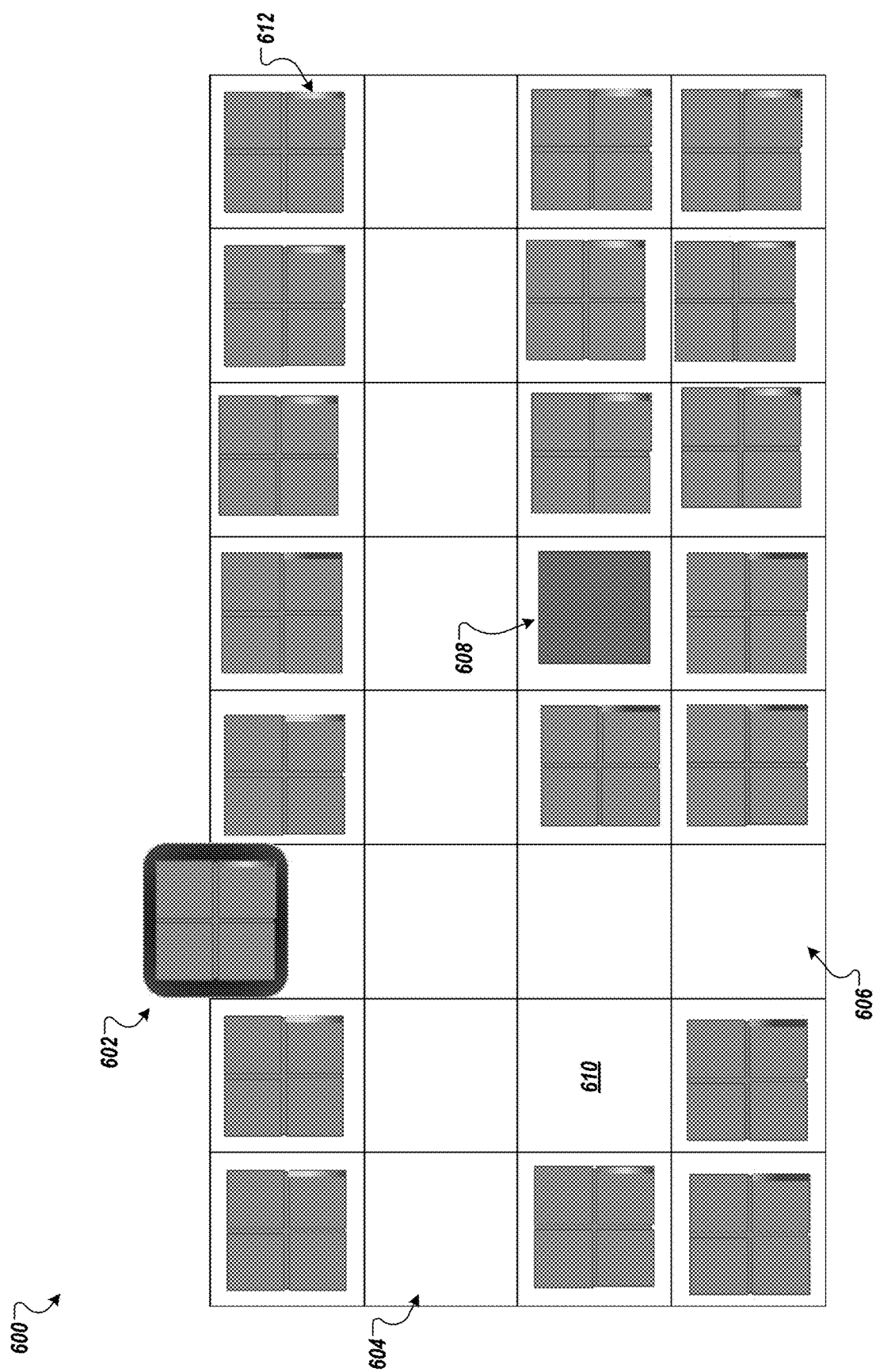
FIG. 6 depicts an example pallet picking area that can be used with automated vehicles and a layer picking gantry device.

FIG. 6 depicts an example pallet picking area 600 that can be used with automated vehicles 602 and a layer picking gantry device (not depicted). The picking area 600 can be similar to the picking areas described above, such as the picking/assembly areas 106, 200, 314, and 408. In the depicted example, the area 600 can include a sufficient number of spaces so that, were pallets to fill each position, some of the internal pallets would be inaccessible by the automated vehicle 602. Accordingly, to maintain accessibility to each position for the automated vehicle 602, pathways 604 and 606 can be maintained in the area 600. Such pathways can be determined by an automated control system, which can control and direct the automated vehicles 602 as well as the picking device.

Such an automated control system can be designed to achieve a variety of objectives and/or tasks, such as determining optimal paths for all automated vehicles 602, making optimal use of the pallets in the picking/assembly area 600 (e.g., if pallets in the picking/assembly area 600 are not being used then place into buffer area), determining and executing an optimal exchange ratio of the pallets of the buffer area and the picking/assembly area 600 (e.g., balance between exchanging pallets between areas (exchanging too frequently can create inefficiencies) and maintaining pallets that are currently being used within the picking/assembly area 600), determining routes that avoid potential automated vehicle collisions (and providing logic/features on automated vehicles to permit for autonomous collision avoidance, such as a minimum spacing distance between automated vehicles), putting pallets used to build "like" orders with other pallets for "like" orders to speed up building like pallets (e.g., minimize the travel time for layer picking device and increases the throughput of pallets being assembled), and/or creating pallets that only need a layer or two taken off, then take the part with the greater layer count and use that for the layer picked pallet (e.g., this can saves time in picking the pallet). These tasks/objectives can be achieved using any of a variety of factors, such as tracking of length of times 612 the pallets are within the picking area 600, tracking the density or "filled" positions of the layer picking area, tracking empty pallets 608, tracking open positions 610, and/or tracking the layers that have been picked, which can ensure that pallets are being assembled in an optimal position to minimize the gantry head movements.

FIGS. 7A-E are flowcharts of example techniques that can be used as part of an automated control system for pallet assembly using automated vehicle and automated layer picking devices. The example techniques can be used to control and optimize the performance of the systems described throughout this document, such as those described above with regard to FIGS. 1-6. These techniques can be performed by, for example, the computing device 150 and/or other suitable device/system for automatically determining and controlling the pallet assembly systems described throughout this document.

Figure 7A:
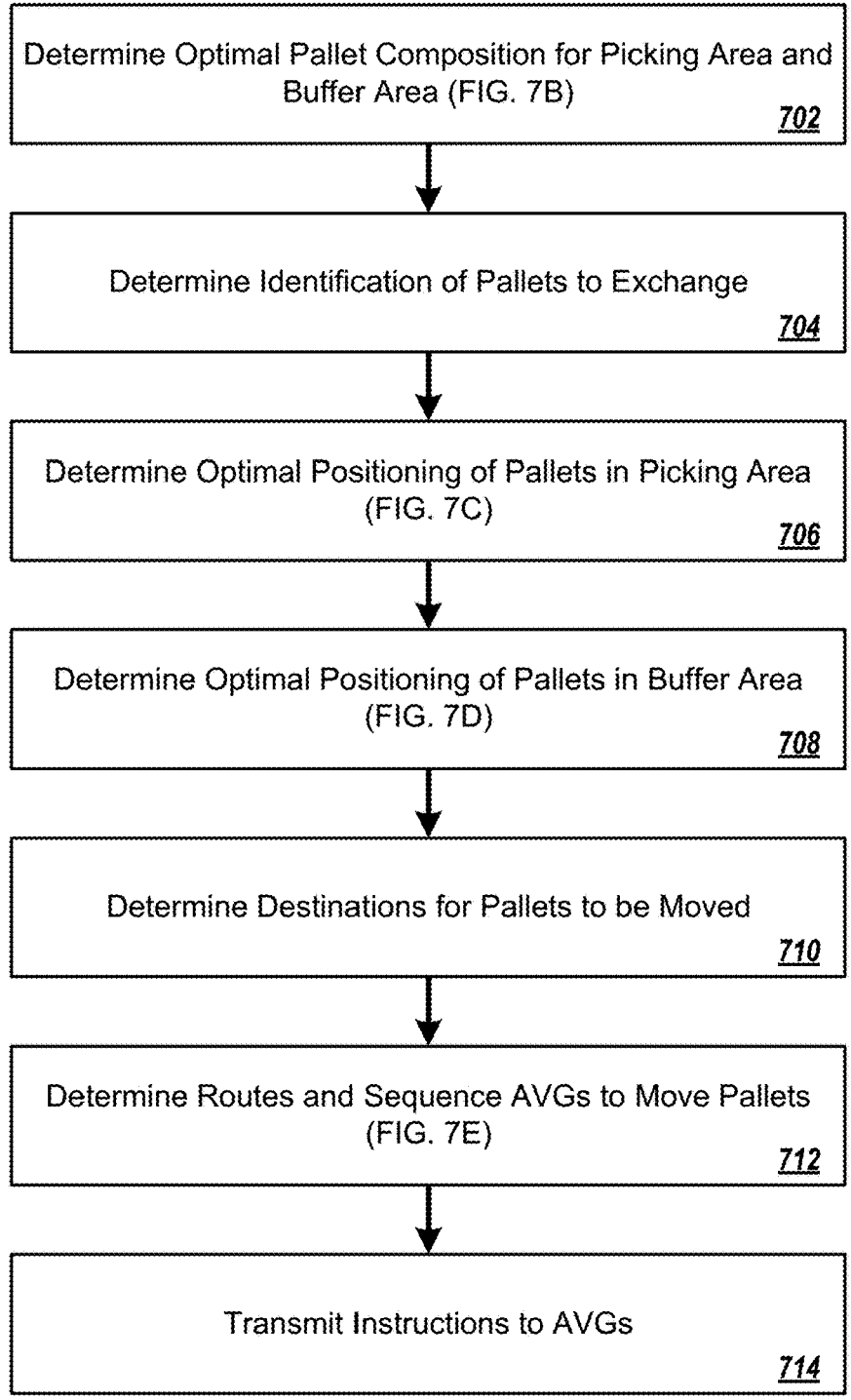
FIGS. 7A-F are flowcharts of example techniques that can be used as part of an automated control system for pallet assembly using automated vehicles and automated layer picking devices.

Referring to FIG. 7A, an example technique 700 is depicted for transmitting instructions to the automated vehicles for positioning and moving pallets to optimize the pallet assembly operations performed by a layer picking device, such as a gantry device and/or a robotic arm picking device. An optimal pallet composition for the picking area and buffer area(s) is determined (702). An example technique for determining that optimal composition is described below with regard to FIG. 7B. Using the current and determined optimal pallet composition for these areas, identification of pallets to be exchanged between these areas can be determined (704). The pallets to be exchanged between these areas can be designated as the pallets to be moved between the areas.

An optimal positioning of pallets in the picking area (706) and the buffer area (708) can be determined. The optimal pallet positioning in the picking area and the buffer area can take into account not only the pallets being moved in and out of the area, but can also evaluate the overall positioning of pallets in the area and may make appropriate adjustments (including to pallets already in those areas) in order to optimize the overall positioning scheme. An example technique for determining pallet positioning in the picking area is provided in FIG. 7C. Similarly, an example technique for determining pallet positioning in the buffer area is provided in FIG. 7D.

From the determinations in 706 and 708, the destinations of pallets to be moved can be determined (710). Using these destinations, routes and sequences of automated vehicles to move the pallets from their current locations to the destination locations can be determined (712). An example technique for performing this is described with regard to FIG. 7E. Once the routes and sequencing of automated vehicle pallet movements are determined, instructions for the automated vehicle movements can be transmitted to the automated vehicles (714).

In some implementations, the determination of routes and/or sequencing of pallet movements are not static, but dynamically performed to maintain the routes and/or sequencing to be updated and optimal. The routes and/or other logic decisions resulting in a change to the routes can be re-evaluated in real time, periodically, and/or when an event occurs (e.g., executed or changed). For example, when an order is received or modified, such a new or modified order can cause reevaluation of the routes and/or other logic decisions.

Figure 7B:
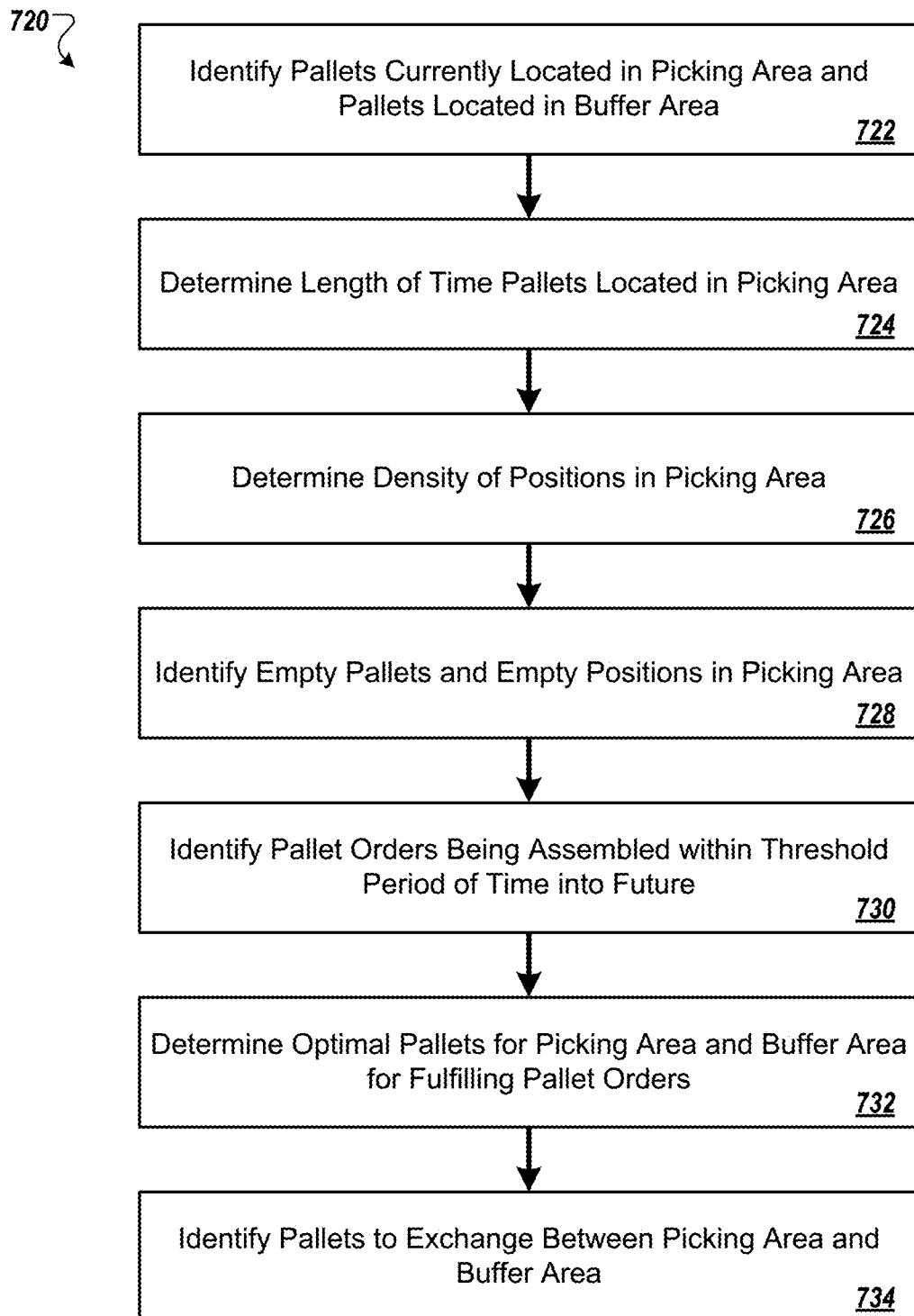

Referring to FIG. 7B, an example technique 720 is depicted for determining the optimal composition of pallets for the picking area and the buffer area. Pallets that are currently located in the picking and buffer areas are identified (722). For the pallets in the picking area, a variety of determinations are made to ensure that the positions in the picking area are being optimized, including determining a length of time they have been located in the picking area (724), a density of the positions in the picking area (726), and identifying any empty pallets or empty positions in the picking area (728). Pallet orders that are being assembled currently and for a threshold period of time into the future (e.g., next 30 minutes, next hour, next 6 hours, next 12 hour) can be identified (730), including identifying the layers that are required to fulfill the orders and the specific pallets (in both the picking and buffer area) that can be used to fulfill those orders. Using the factors determined in 724-730, optimal pallets for the picking area and the buffer area can be determined (732). With the optimal pallets identified for each of the picking and buffer area, the pallets that need to be exchanged between the areas (difference between current pallets in areas and optimal pallets identified for areas) can be identified (734).

Figure 7C:
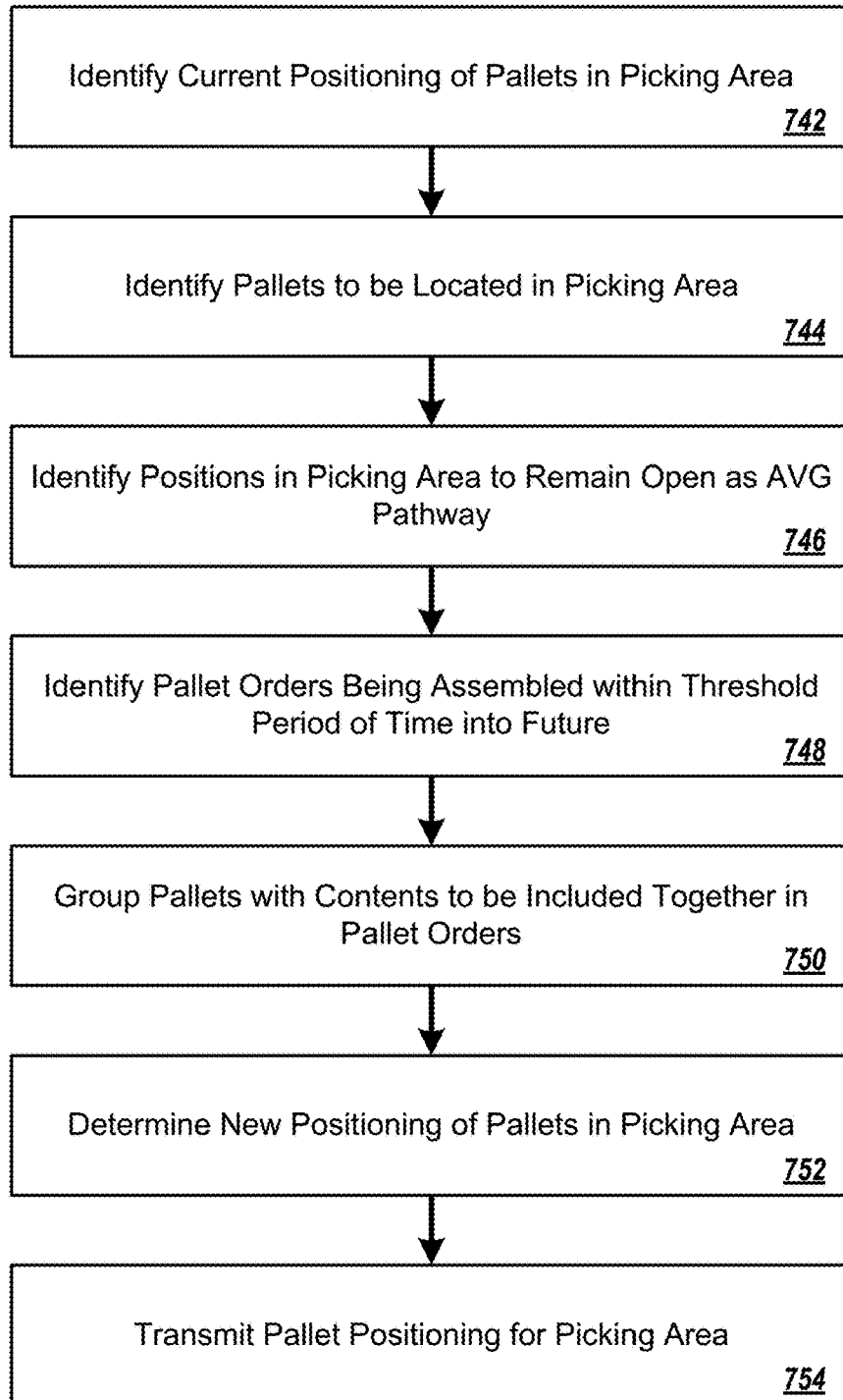

Referring to FIG. 7C, an example technique 740 is depicted for determining the positioning of pallets in the picking area. The current positioning of pallets is identified (742) and the pallets to be located in the area (as determined by technique 720) are identified (744). Positions in the picking area to remain open (unoccupied by pallets) in the picking area to provide a pathway for automated vehicle movement are identified (746) and pallet order to be assembled over a threshold period of time into the future are identified (748). Pallets with contents that will be used to assemble the same or similar orders can be grouped together so that they will be near each other within the area (minimize picker travel time and maximize pallet assembly throughput) (750). Using these determinations and factors (742-750), new positioning of pallets in the picking area can be determined (752) and made available for route determination for the automated vehicles (754).

Figure 7D:
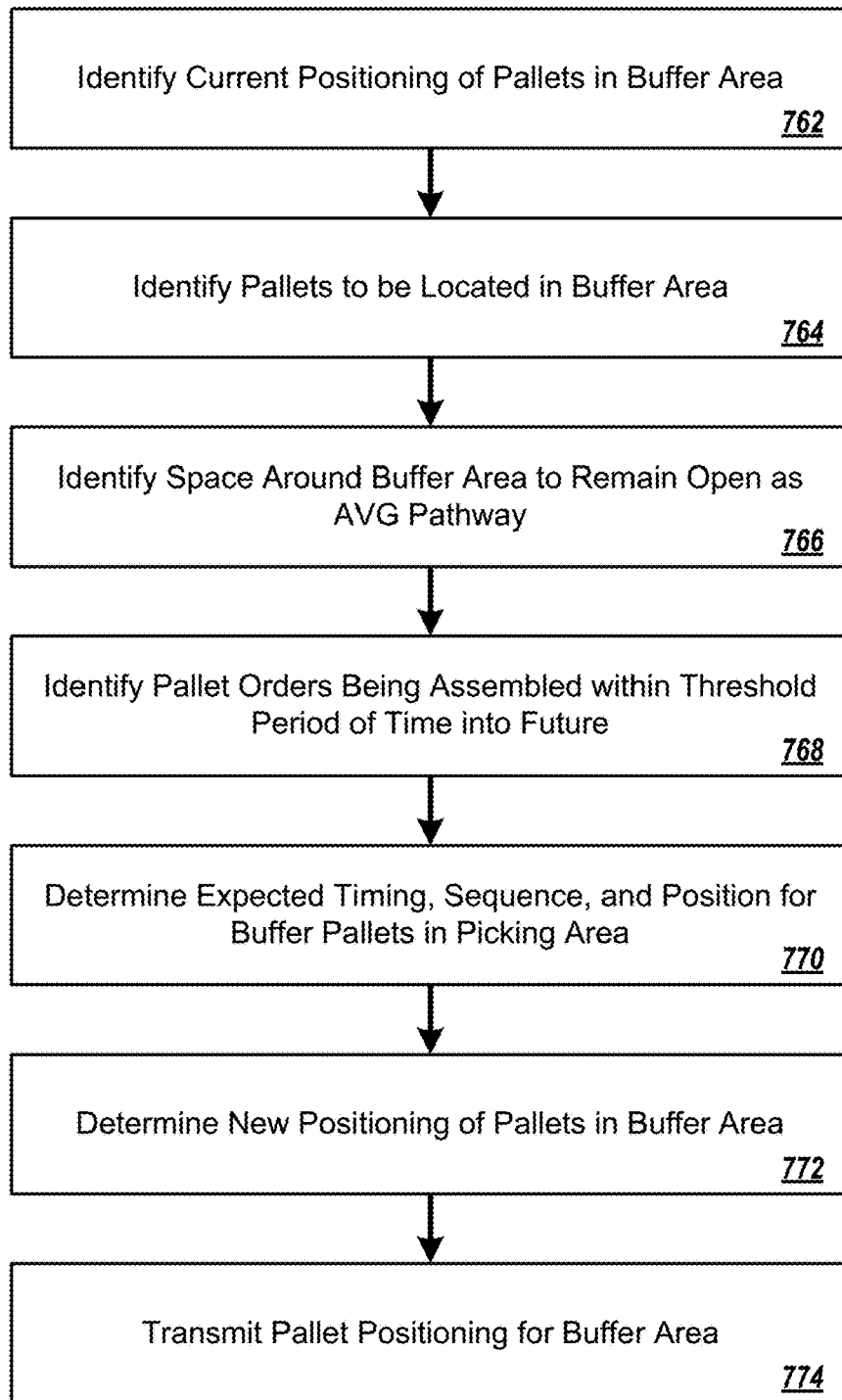

Referring to FIG. 7D, an example technique 760 is depicted for determining the positioning of pallets in the buffer area. The current positioning of pallets is identified (762) and the pallets to be located in the area (as determined by technique 720) are identified (764). Spaces around the buffer area to remain open (unoccupied by pallets) to provide a pathway for automated vehicle movement are identified (766) and pallet order to be assembled over a threshold period of time into the future are identified (768). Using the order information, a determination of the timing, sequence, and eventual positioning of buffer pallets for the picking area (when they are moved from the buffer area to the picking area) is estimated so that they can be positioned in optimal locations in the buffer area to minimize automated vehicle travel time to move them from the buffer area into the picking area (770). Using these determinations and factors (762-770), new positioning of pallets in the buffer area can be determined (772) and made available for route determination for the automated vehicles (774).

Figure 7E:
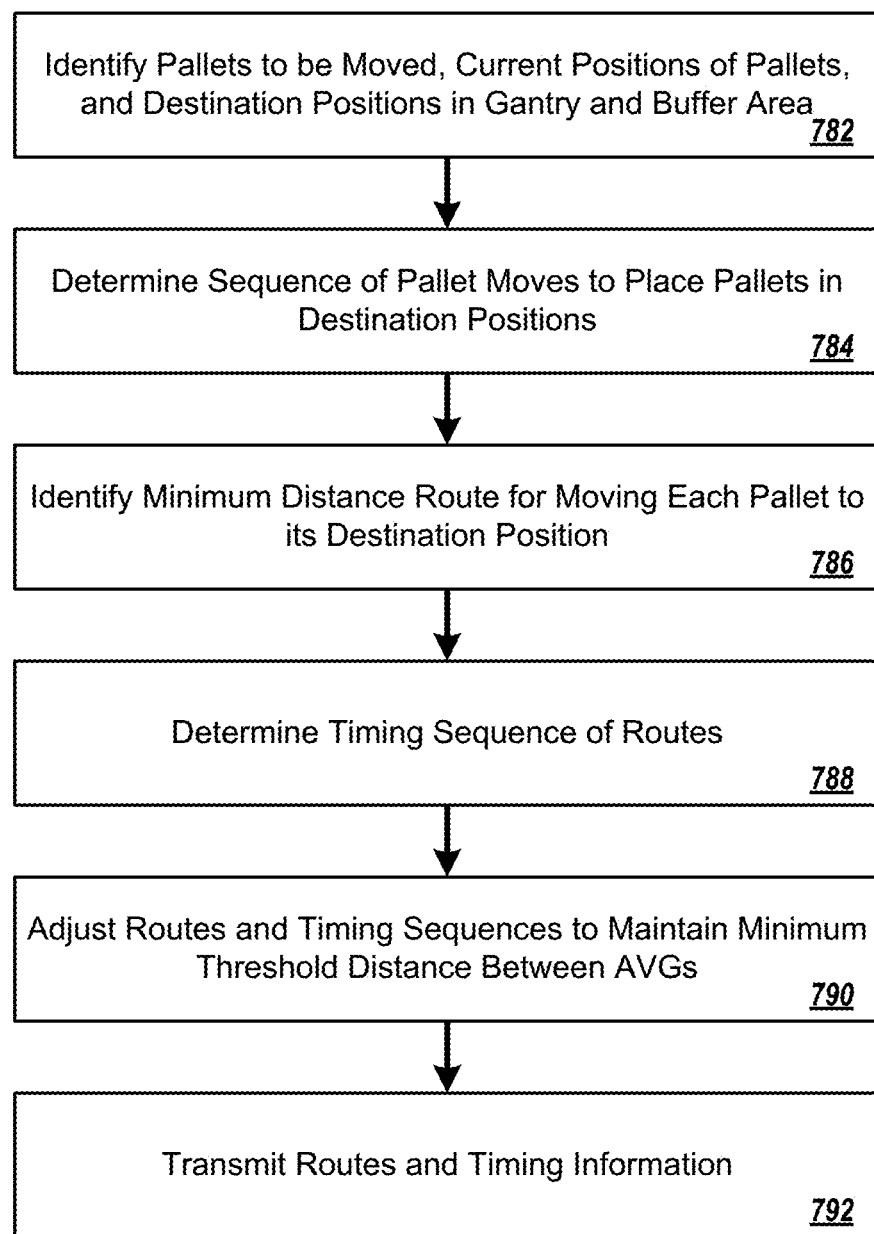

Referring to FIG. 7E, an example technique 780 is depicted for determining routes and sequencing of those routes to move position pallets in the buffer and picking areas. Identification of the pallets to be moved, their current positioning, and their destination positioning can be determined (782). A sequence of dependent movements can be determined to place the pallets in their destination locations (784). For example, for a pallet position that is the destination for a first pallet and that is currently occupied by a second pallet, the movement of the second pallet can be identified as having to occur sequentially before movement of the first pallet (first pallet movement is dependent on the second pallet movement occurring earlier in time). Routes to minimize the distance travelled to transport each pallet from its current position to its destination position can be identified (786), and timing sequences for the routes can be determined (788). Routes and timing sequences can be adjusted in order to avoid collisions and the maintain a minimum threshold distance between the automated vehicles (790), and can then be provided for use to control operation of the automated vehicles to execute on the determinations (792).

In some implementations, at least some of the technique 780, including calculation, adjustment, and/or update of the routes and timing sequences can be performed by automated vehicles on their own without interacting with a remote computing device.

Figure 7F:
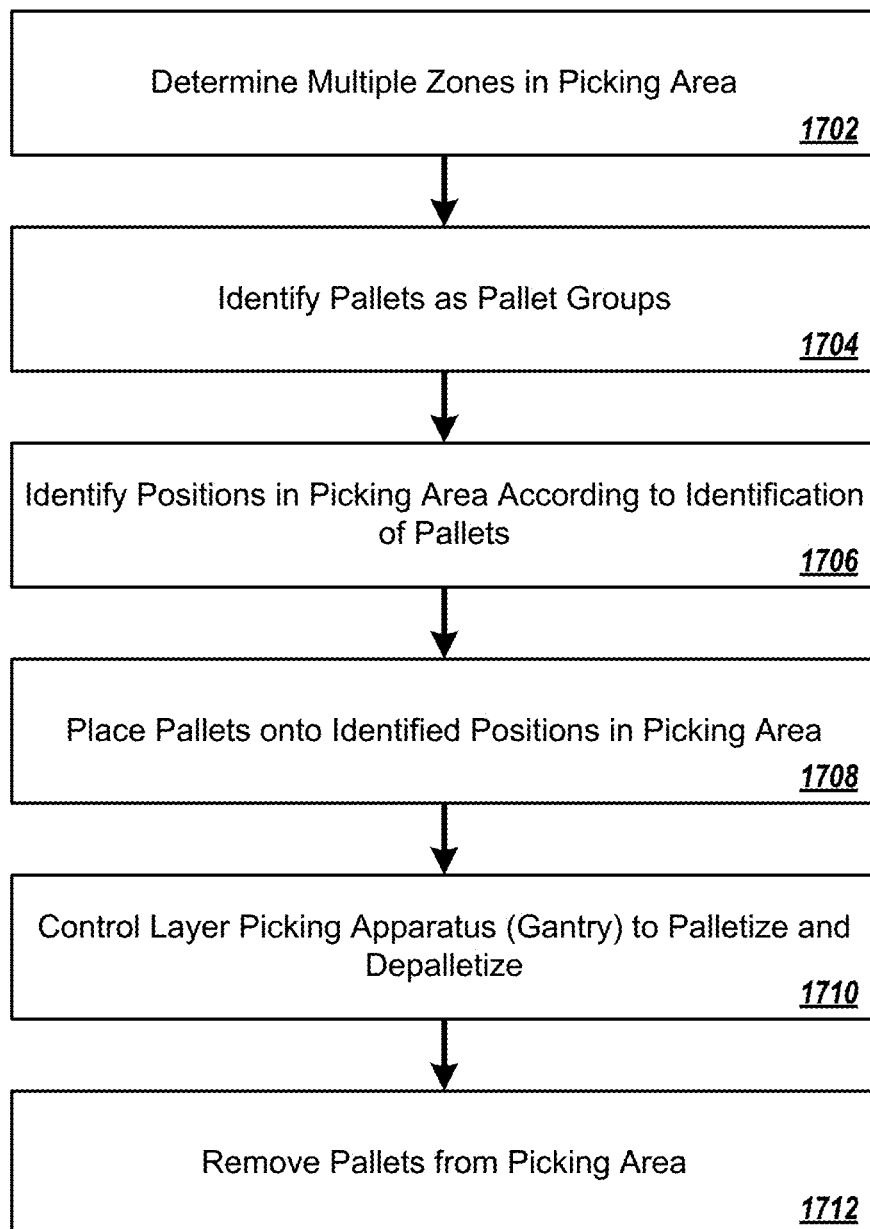

FIG. 7F is a flowchart of an example technique 1700 for palletizing (including depalletizing) in a layer pick area. The technique 1700 can include multiple operations. For example, multiple zones (e.g., the first, second, and third zones described herein) are determined in a layer pick area (e.g., the assembly area described herein) (1702). Each of a plurality of pallets is identified as one of multiple pallets groups (1704). Such multiple pallet groups can be determined by one or more attributes of pallets, such as velocities representative of, for example, how fast layers of goods are removed from or loaded onto pallets (e.g., the first, second, and third velocity pallets described herein). Positions in the layer pick area are identified according to identification of the pallets (e.g., according to the velocities of the pallets) (1706). Each of the identified positions are included in one of the multiple zones according to the attributes of the pallets. The pallets are placed onto the identified positions in the layer pick area (1708). A layer pick apparatus (e.g., a layer pick gantry, robotic arm, etc.) is operated to palletize and depalletize in the layer pick area (1710). Once the pallitizing/depalletizing is complete for a pallet, the pallet is removed from the layer pick area (1712). The pallet can be removed using an automated vehicle, such as an AGV, SDV, etc., as described herein.

Figure 8A:
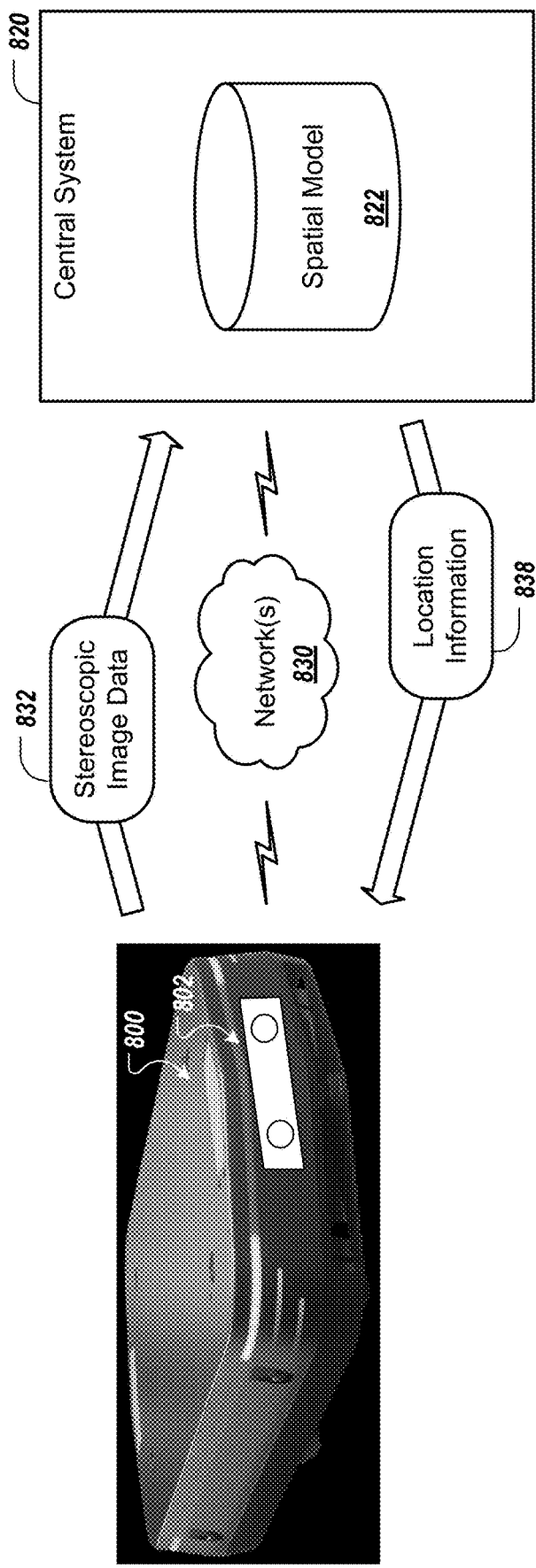
FIGS. 8A-C depict example systems to control operation of the automated vehicles using stereoscopic vision.
Figure 8B:
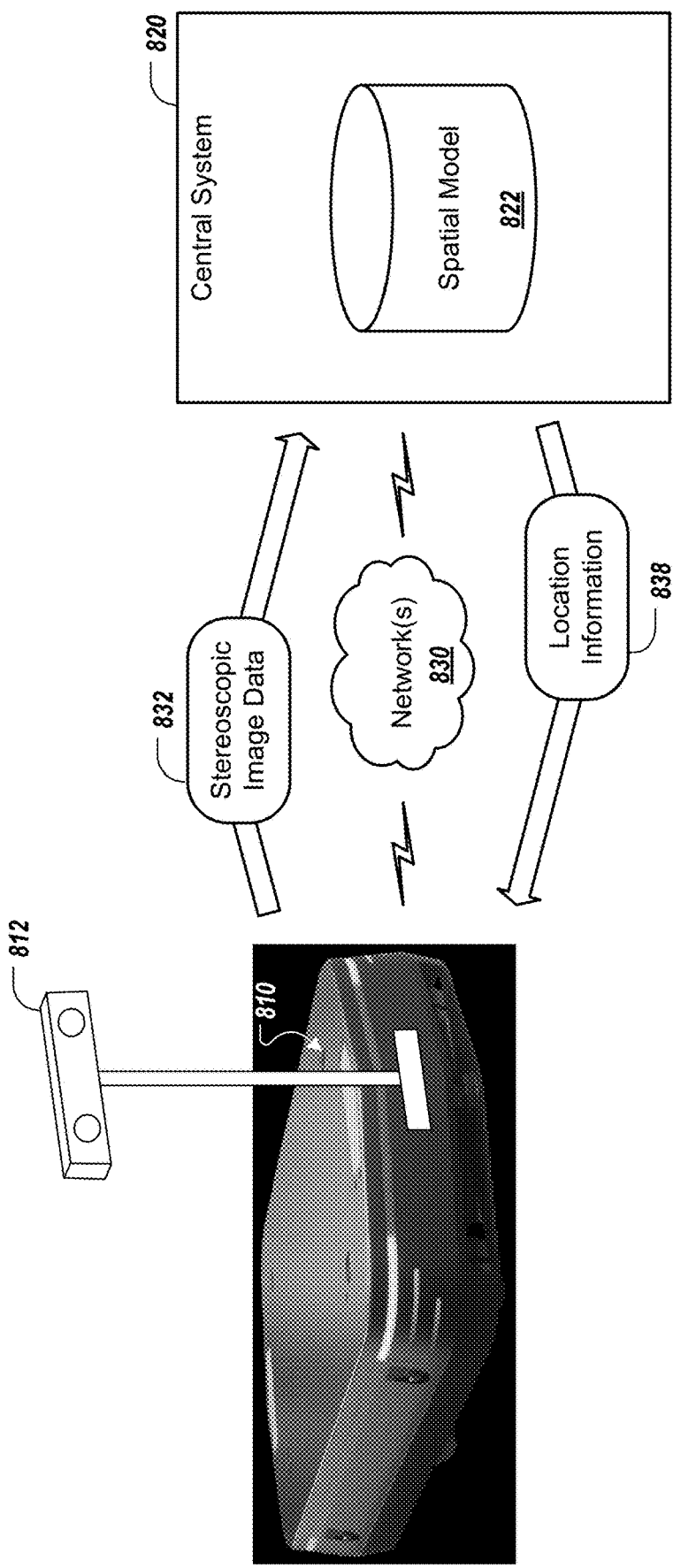
Figure 8C:
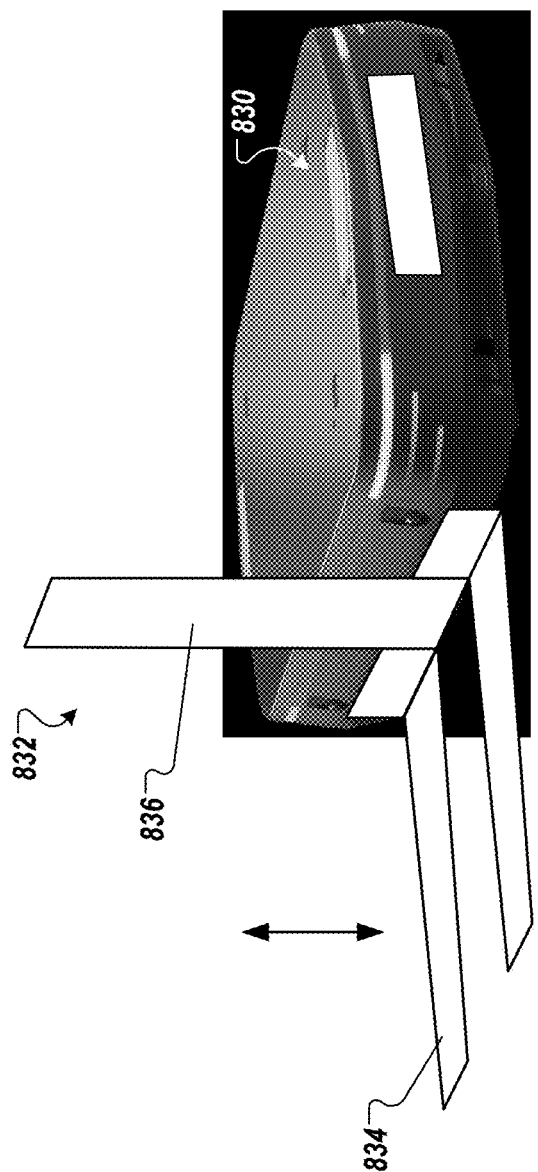

FIGS. 8A-C depict example systems to control operation of the automated vehicles using stereoscopic vision.

Referring to FIG. 8A, an example automated vehicle 800 is depicted with stereoscopic imaging devices 802 (e.g., stereoscopic cameras) mounted on the side of the automated vehicle 800. The automated vehicle 800 may include multiple stereoscopic imaging devices that are positioned on its sides, such as an additional stereoscopic imaging device positioned on an opposing side of the automated vehicle 800. The stereoscopic image data 832 can be generated by the automated vehicle 800 and used to determine a precise location of the automated vehicle 800 within a physical environment, such as a warehouse. An example system for making such location determination for the automated vehicle 800 can include a central system 820 that contains a spatial model 822 of the environment (e.g., point cloud of the environment). In some instances, the automated vehicle 800 can transmit the stereoscopic image data 832 over one or more networks 830 (e.g., Wi-Fi) to the central system 820, which can generate spatial positioning of features (e.g., points) from the stereoscopic image data 832, compare that spatial positioning of features to the spatial model 822 to determine the location of the automated vehicle 800, and then transmit the location information 838 back to the automated vehicle 800 (or to other systems used to control operation of the automated vehicle 800). Alternatively, the spatial model can be loaded onto the automated vehicle 800 and those determinations can be made locally on the automated vehicle 800. Techniques, systems, devices, and features for using stereoscopic vision to determine a vehicle's location within a warehouse, which can be applied to the automated vehicle 800, are described in U.S. Pat. No. 10,242,273, entitled TRACKING VEHICLES IN A WAREHOUSE ENVIRONMENT, issued Mar. 26, 2019, the entire contents of which are incorporated by reference.

Referring to FIG. 8B, another example automated vehicle 810 is depicted. In this example, the stereoscopic imaging device 812 is positioned and extends above a top surface of the automated vehicle 810. Such a positioning of the stereoscopic imaging device 812 can provide a higher vantage point (higher relative to the ground), which may be used to generate more spatial positioning features (e.g., points) that can be used to more accurately determine the location of the automated vehicle 810 using the spatial model 822.

FIG. 8C illustrates an example automated vehicle 830. The automated vehicle 830 can be used for the automated vehicles described herein, such as the automated vehicles 140, 310, 404, 434, 800, 1030, etc. In this example, the automated vehicle 830 can lift a pallet from the ground for transportation without losing flexibility of the automated vehicle 830 in moving freely in/out and within various areas in a warehouse environment, such as assembly areas, dock areas, case pick areas, etc. The automated vehicle 830 includes a pallet lift structure 832 having forks 834 for supporting an underneath of a pallet, and a fork lift mechanism 836 for vertically moving the forks 834 with respect to the ground.

In addition or alternatively, one or more pallets can be placed with a stand on the ground. The stand is configured to support the pallets at a distance away from the ground so that an automated vehicle or other vehicles can easily engage and lift the pallets for transportation. For example, the stand can provide a sufficient room underneath a pallet from the ground so that an automated vehicle can at least partially move into the room, permit for the pallet to be placed thereon, and move out from the room for transportation.

Figure 9:
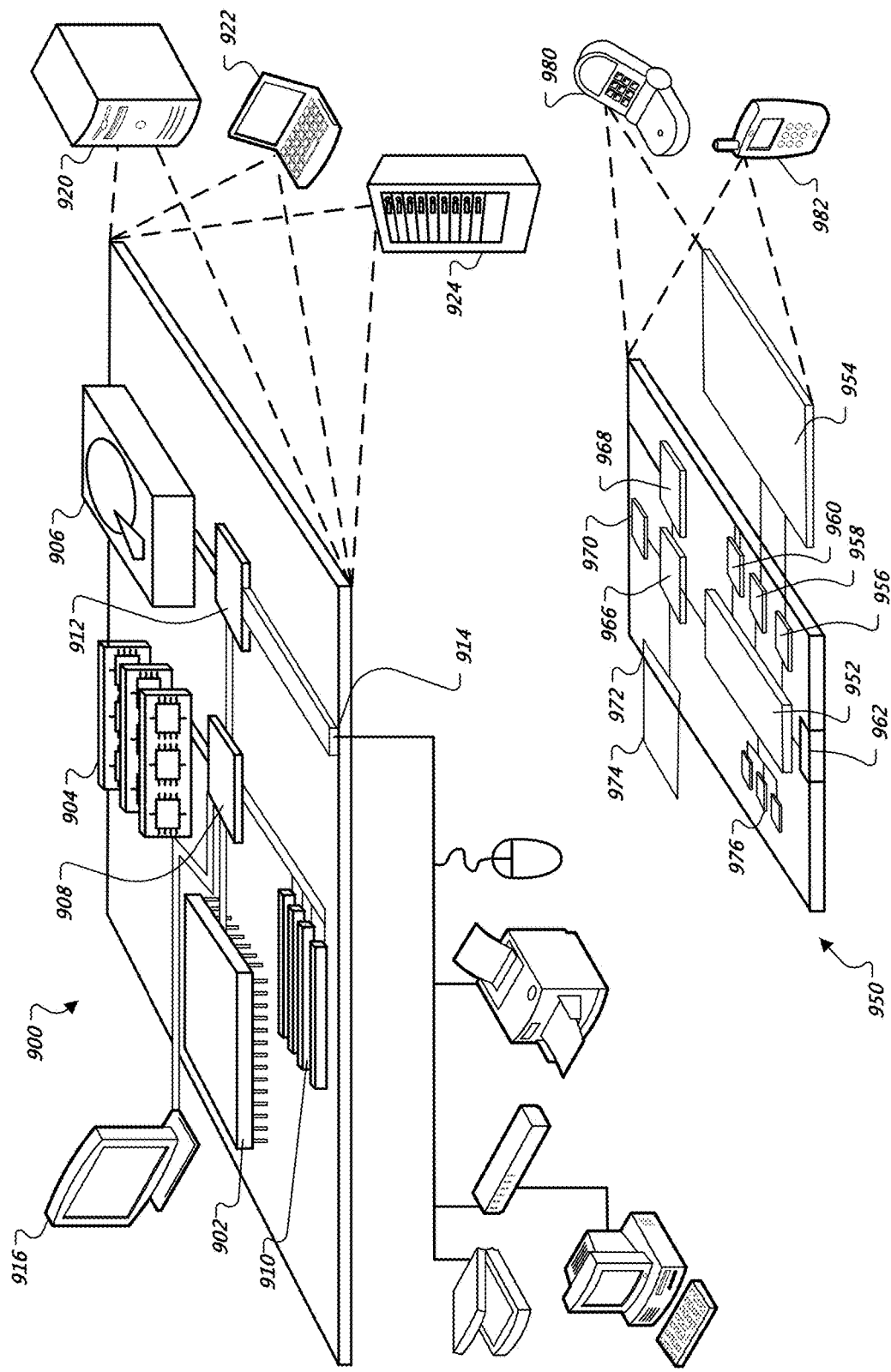
FIG. 9 is a block diagram of example computing devices that may be used to implement the devices, systems, and methods described in this document.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provided, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Figure 10:
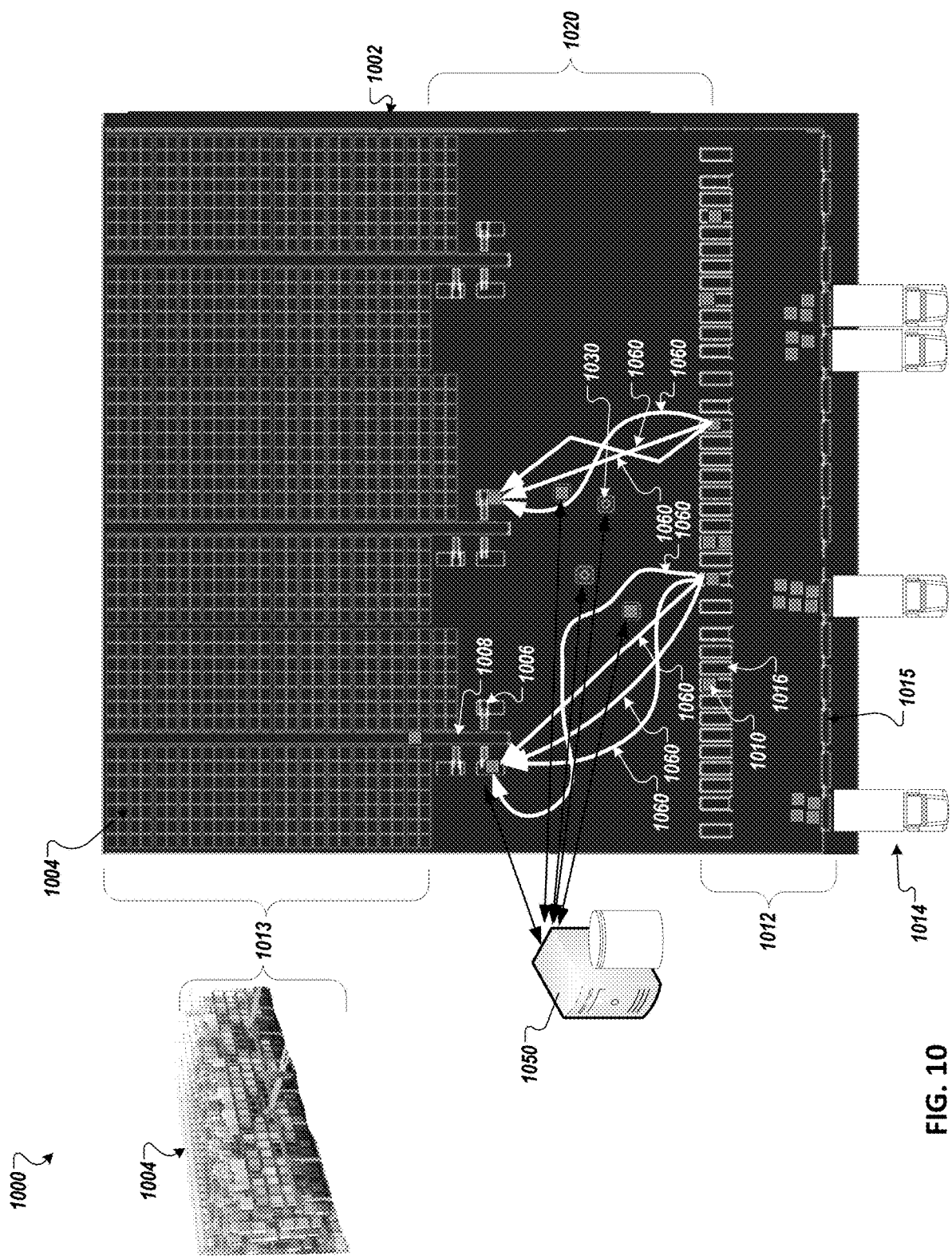
FIG. 10 depicts an example pallet transportation system in a warehouse.
Figure 11:
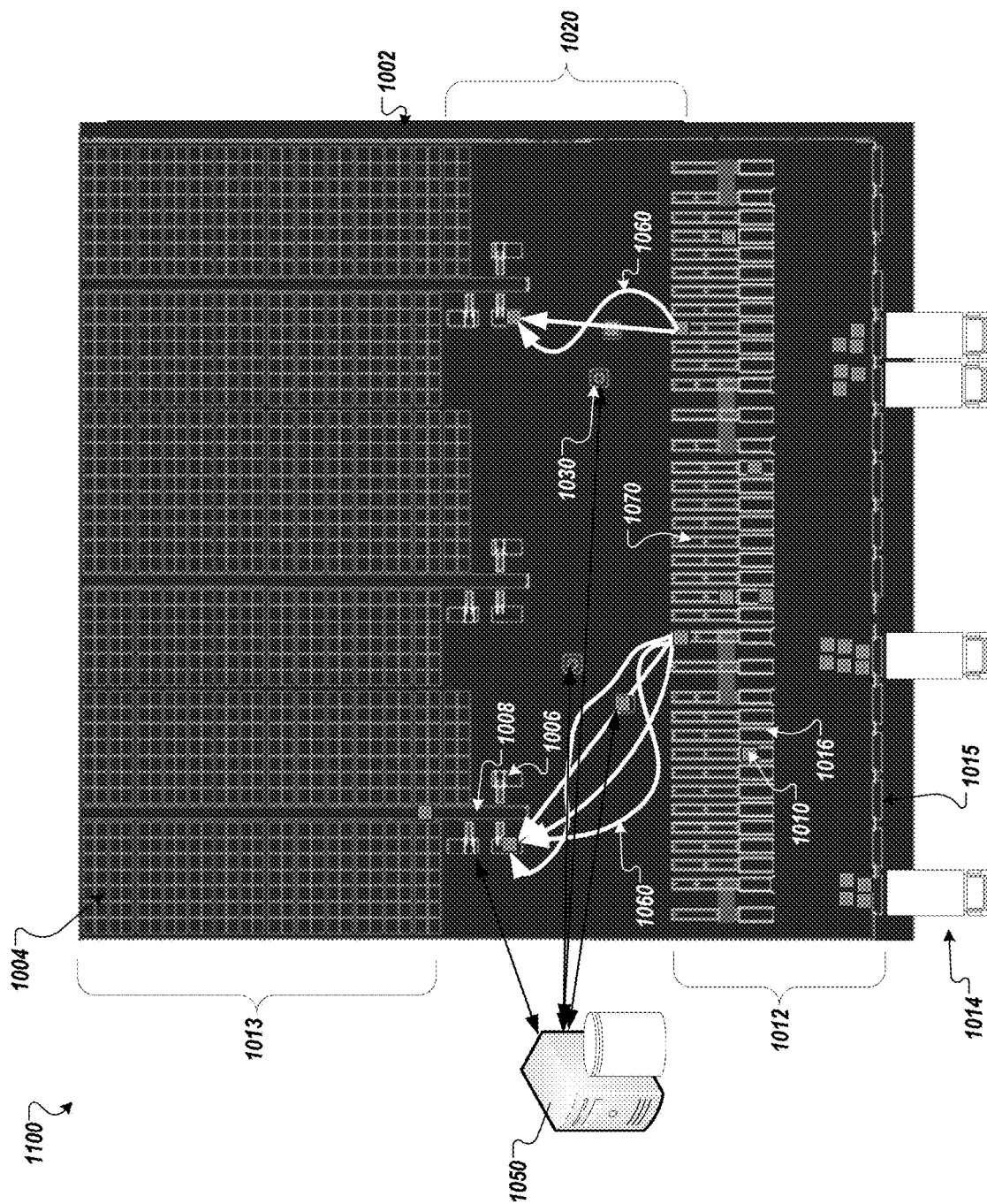
FIG. 11 depicts another example pallet transportation system in a warehouse.
Figure 12:
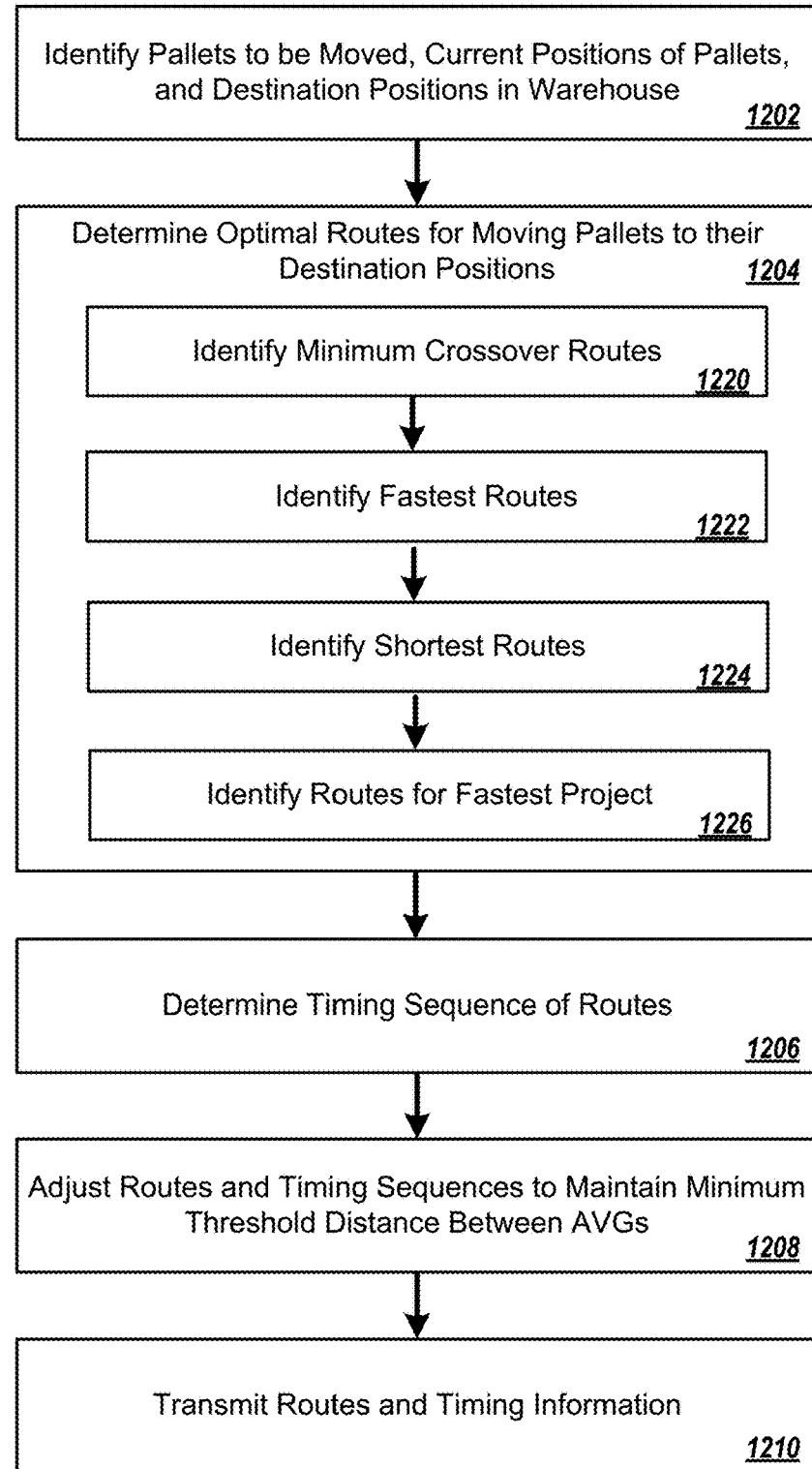
FIG. 12 is a flowchart of an example technique that can be used as part of the pallet transportation system of FIGS. 10 and 11.

Referring to FIGS. 10-12, example pallet transportation systems are described, which are configured to transport pallets between different positions in a warehouse.

FIG. 10 depicts an example pallet transportation system 1000 in a warehouse 1002. The warehouse 1002 includes a pallet storage area 1003, which can include pallet storage racks 1004 which can be arranged in rows and/or columns and configured to store pallets 1010 in different levels. One or more elevators 1006 and rack conveyor belts 1008 are used to elevate pallets 1010 to different levels and move them into desired locations in the racks 1004. In addition or alternatively, one or more cranes and/or other suitable transportation systems can be used in the warehouse 1002. The warehouse 1012 includes a staging area 1012 (e.g., a loading/unloading area) to move pallets in and out of trucks 1014 through doors 1015. For example, manual labor can be used to unload pallets from trucks 1014 and deliver them onto decks 1016, and pick pallets up from the decks 1016 and load them onto trucks 1014. In addition or alternatively, loading/unloading and/or transportation in the staging area 1012 can be performed using an automated system, such as automated guided vehicles (automated vehicles) described herein.

The warehouse 1002 that uses the pallet transportation system 1000 can be of other types. For example, the pallet transportation system 1000 can be used in a manual warehouse that has no automated equipment (e.g., elevators, conveyor belts, automated vehicles, etc.). In other example, the warehouse 1002 can be a cross-docking warehouse in which pallets unloaded in an unloading area (e.g., from inbound trucks, trains, or other vehicles) are directly transported to, and loaded into, outbound trucks, trains, or other vehicles in a loading area, skipping a storage area. Such outbound trucks, trains, or other vehicles can be loaded with a variety of pallets or items that are consolidated and/or regrouped from pallets or items from one or more inbound trucks, trains, or other vehicles.

The warehouse 1002 further includes a pallet transportation area 1020 in which the pallet transportation system 1000 operates to automate and optimize transportation of pallets between the staging area 1012 and the pallet storage area 1003. The pallet transportation system 1000 includes automated guided vehicles (automated vehicles) 1030 to transport pallets 1010 in the pallet transportation area 1020. Automated vehicles 1030 are configured similarly to the automated vehicles 140, 310, 404, 434, 800, and 830. For example, automated vehicles are configured to automatically navigate between the staging area 1012 and the pallet storage area 1003, and are capable of picking up, moving, and dropping off pallets.

The pallet transportation system 1000 includes a computing device 1050 for controlling automated vehicles 1030 and/or other devices and systems in the warehouse 1002. Although a single computing device 1050 is illustrated and primarily described herein, multiple computing devices can be configured to perform same or similar functions. The computing device 1050 is configured to communicate with automated vehicles 1030 and/or other devices and systems (e.g., elevators 1006, rack conveyor belts 1008, etc.), and manage and optimize transportation of pallets in the warehouse 1002.

The pallet transportation system 1000 is configured to optimize operation of automated vehicles 1030 in the warehouse 1002 using various algorithms. Algorithms can be configured to calculate a plurality of possible routes 1060 for each automated vehicle from a start location to an end location, and determine an optimal route among them. For example, algorithms can be configured to choose a shortest route for at least one of the automated vehicles. In addition or alternatively, algorithms can be configured to minimize the number of cross-overs of the routes taken by multiple automated vehicles, thereby reducing the likelihood of collision between automated vehicles. In addition or alternatively, algorithms can be configured to optimize the timing of operation of respective automated guided vehicles, thereby reducing the likelihood of collision between automated vehicles. In addition or alternatively, algorithms can be configured to maximize the speed of at least one of the automated vehicles. In addition or alternatively, algorithms can be configured to minimize the time required to complete a particular project of moving pallets in a warehouse.

FIG. 11 depicts another example pallet transportation system 1100 in a warehouse 1002. The system 1100 can be similar to the system 1000 described herein with regard to FIG. 10, except that the staging area 1012 can optionally include a plurality of staging conveyor belts 1070 to automatically deliver pallets to the pallet transportation area 1020. The staging conveyor belts 1070 can be arranged and routed from the decks 1016 to convey pallets between the decks 1016 and the pallet transportation area 1020.

FIG. 12 is a flowchart of an example technique 1200 that can be used as part of the pallet transportation system of FIGS. 10 and 11. The technique 1200 is designed to determine optimal routes to move pallets in a warehouse, such as routes between a staging area (e.g., pallet loading/unloading area) and a pallet storage area (e.g., pallet storage racks). At 1202, identification of the pallets to be moved, their current positioning, and their destination positioning can be determined. At 1024, optimal routes are determined for moving pallets to their destination positions. For example, optimal routes can be determined by identifying routes that provide minimum crossovers therebetween when the pallets are transported to their destination positions along those routes (1220), by identifying fastest routes for moving pallets to their destination positions (1222), by identifying shortest routes for moving pallets to their destination positions (1224), and/or by identifying routes that result in fastest completion of a project of moving entire pallets in desired manner (1226). At 1206, once optimal routes are determined, timing sequences for the routes can be determined. At 1208, routes and timing sequences can be adjusted in order to avoid collisions and maintain a minimum threshold distance between the automated vehicles. At 1210, such adjusted routes and timings can then be provided for use to control operation of the automated vehicles to execute on the determinations.

The automated pallet assembly technology described throughout this document can, additionally and/or alternatively, be implemented using automated vehicles that retain and support pallets (instead of dropping pallets off on the floor/ground, a stand, or other support) as they are being accessed, processed, assembled, disassembled, and/or having other operations performed on them by other devices, such as an gantry, robotic arm, and/or other device. For example, an automated vehicle 310 can be directed to pick-up, support, and move a pallet into a particular position in the layer pick area 314 and then stay in that position with the pallet as the pallet is assembled/disassembled by the layer picking gantry device 312. The automated vehicle 310 can then be directed to move with the pallet out of the layer pick area 314 once current use of the pallet has been completed. Such a configuration of retaining pallets on the automated vehicles while they are being accessed by other devices can be used for some or all pallets within a particular area, and can be combined with techniques that instead drop-off pallets for processing. Retaining pallets on automated vehicles while the pallets are being accessed can permit for more rapid movement of pallets in and out of a processing area (e.g., layer pick area 314), but may use a larger number of automated vehicles within a particular area to accomplish these efficiencies. Additional and/or alternate advantages may also be provided.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for automatically assembling pallets of goods, the method comprising:
   identifying a target supply pallet among a plurality of pallets, the target supply pallet including supply goods available for transfer to other pallets;
   controlling a first automated pallet mover to place the target supply pallet in an assembly area that is accessible by a layer picking apparatus, wherein the first automated pallet mover is mobile and is configured to move in and out of the assembly area, wherein the layer picking apparatus is affixed to a support structure and is configured to reach pallets located within the assembly area;
   controlling the layer picking apparatus to transfer at least a portion of the supply goods from the target supply pallet to a target output pallet, the target output pallet positioned at a target output location within the assembly area;
   determining an optimal outbound path for a second automated pallet mover to reach the target output location within the assembly area; and
   controlling the second automated pallet mover to move the target output pallet along the optimal outbound path and exit the assembly area with the target output pallet.

2. The method of claim 1, wherein the layer picking apparatus includes at least one of a layer picking gantry or a robotic arm.

3. The method of claim 1, wherein the first automated pallet mover and the second automated pallet mover include automated vehicles.

4. The method of claim 1, wherein the first automated pallet mover is the same as the second automated pallet mover.

5. The method of claim 1, wherein the assembly area includes a plurality of cells that are defined in a gridded arrangement, the target output location being selected from the plurality of cells.

6. The method of claim 5, wherein the first automated pallet mover is controlled to place the target supply pallet at a target supply location of the assembly area; and
   wherein the target supply location is determined such that the target supply location is always accessible by the first automated pallet along at least one path defined through the gridded arrangement of the plurality of cells on the assembly area.

7. The method of claim 6, wherein the target supply location for the supply pallet and the target output location for the output pallet are determined such that every pallet is always accessible along at least one path defined through the gridded arrangement of the plurality of cells on the assembly area.

8. The method of claim 6, further comprising:
   determining that the target supply pallet is a first pallet having one or more layers of goods to be moved onto or out from the first pallets less than a first threshold number of times per a predetermined period of time; and
   determining the target supply location in a first zone of the assembly area.

9. The method of claim 8, further comprising:
determining that the target supply pallet is a second pallet having one or more layers of goods to be moved onto or out from the second pallets more than the first threshold number of times per the predetermined period of time; and
determining the target supply location in a second zone of the assembly area, the first zone being at least partially surrounded by the second zone.

10. The method of claim 9, further comprising:
determining that the target supply pallet is a third pallet having one or more layers of goods to be moved onto or out from the third pallets less than a second threshold number of times per the predetermined period of time, the second threshold number of times being smaller than the first threshold number of times; and
determining the target supply zone in a third zone of the assembly area, the second zone being at least partially surrounded by the third zone.

11. A system for automatically assembling pallets of goods, the system comprising:
an assembly area defining a first zone and a second zone, the first zone being at least partially surrounded by the second zone;
one or more automated pallet movers configured to place first pallets in the first zone and second pallets in the second zone, the first pallets having one or more layers of goods to be moved onto or out from the first pallets less than a first threshold number of times per a predetermined period of time, and the second pallets having one or more layers of goods to be moved onto or out from the second pallets more than the first threshold number of times per the predetermined period of time; and
a layer picking apparatus configured to transfer at least a portion of goods among the first pallets and the second pallets.

12. The system of claim 11, wherein the assembly area further includes a third zone, the second zone being at least partially surrounded by the third zone,
wherein the one or more automated pallet movers are configured to place third pallets in the third zone, the third pallets having one or more layers of goods to be moved onto or out from the third pallets less than a second threshold number of times per the predetermined period of time, the second threshold number of times being smaller than the first threshold number of times, and
wherein the layer picking apparatus is configured to transfer at least a portion of goods among the first pallets, the second pallets, and the third pallets.

13. The system of claim 11, wherein the one or more automated pallet movers are configured to move the first pallets from a storage area to the first zone of the assembly area, and
wherein the one or more automated pallet movers are configured to move the second pallets from the storage area to the second zone of the assembly area.

14. The system of claim 12, wherein the third zone is arranged on a periphery of the assembly area.

15. The system of claim 12, wherein the one or more automated pallet movers are configured to move the third pallets between the third zone of the assembly area and a buffer area, the buffer area disposed at least partially around the assembly area.

16. The system of claim 15, wherein the automated pallet movers move along straight routes between the third zone of the assembly area and the buffer area.

17. The system of claim 11, wherein the assembly area includes a plurality of cells in a gridded arrangement.

18. The system of claim 11, wherein the layer picking apparatus includes a layer picking gantry.

19. The method of claim 11, wherein the automated pallet movers includes AGV and/or SDV.

20. The method of claim 11, wherein the automated pallet movers are configured to remove the first pallets from the first zone of the assembly area, and configured to remove the second pallets from the second zone of the assembly area.

* * * * *

UNITED STATES PATENT AND TRADEMARK OFFICE
CERTIFICATE OF CORRECTION

PATENT NO. : 11,479,411 B2
APPLICATION NO. : 17/074457
DATED : October 25, 2022
INVENTOR(S) : Christopher Frank Eckman et al.

Page 1 of 1

It is certified that error appears in the above-identified patent and that said Letters Patent is hereby corrected as shown below:

In the Claims

In Column 28, Claim 19, delete "The method of claim 11," and insert -- The system of claim 11, --, therefor.

In Column 28, Claim 20, delete "The method of claim 11," and insert -- The system of claim 11, --, therefor.

Signed and Sealed this
Seventh Day of March, 2023

Katherine Kelly Vidal
*Director of the United States Patent and Trademark Office*